April 26, 1960  P. E. ANDERSON ET AL  2,933,981
AUTOMATIC REPEATING ROCKET LAUNCHER
Filed Oct. 26, 1953  25 Sheets-Sheet 3
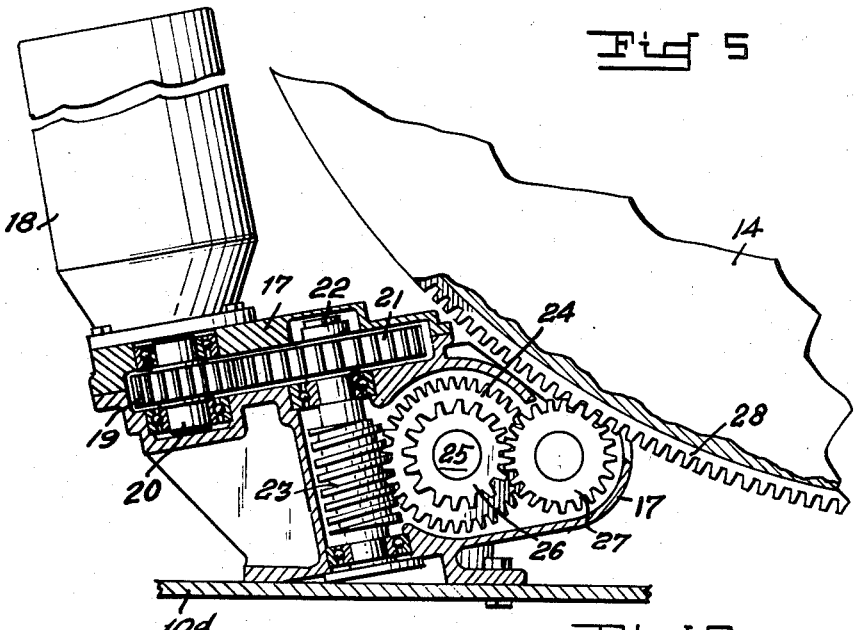
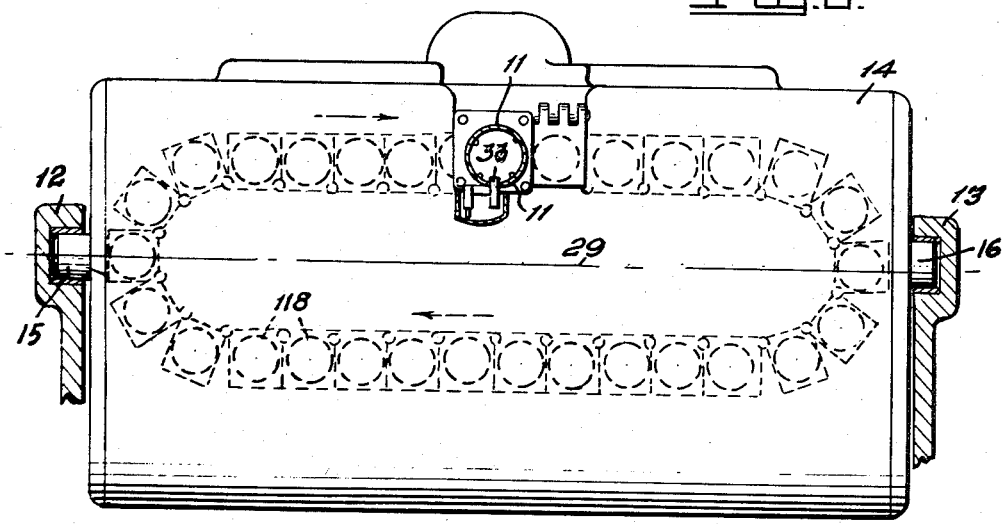
INVENTORS,
Paul E. Anderson
Theodore Q. Cromp
BY Paul I. Evans
Maurice Ransom
ATTORNEYS.

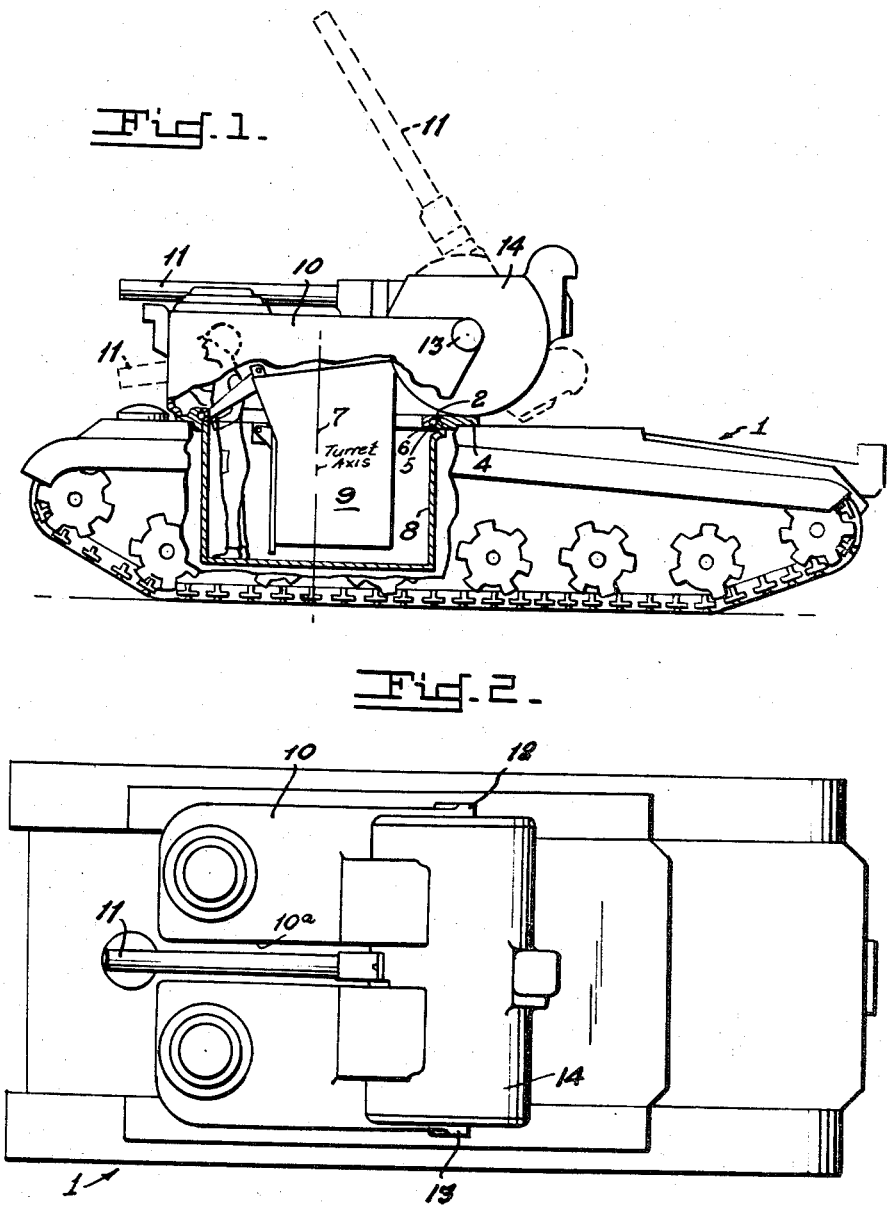

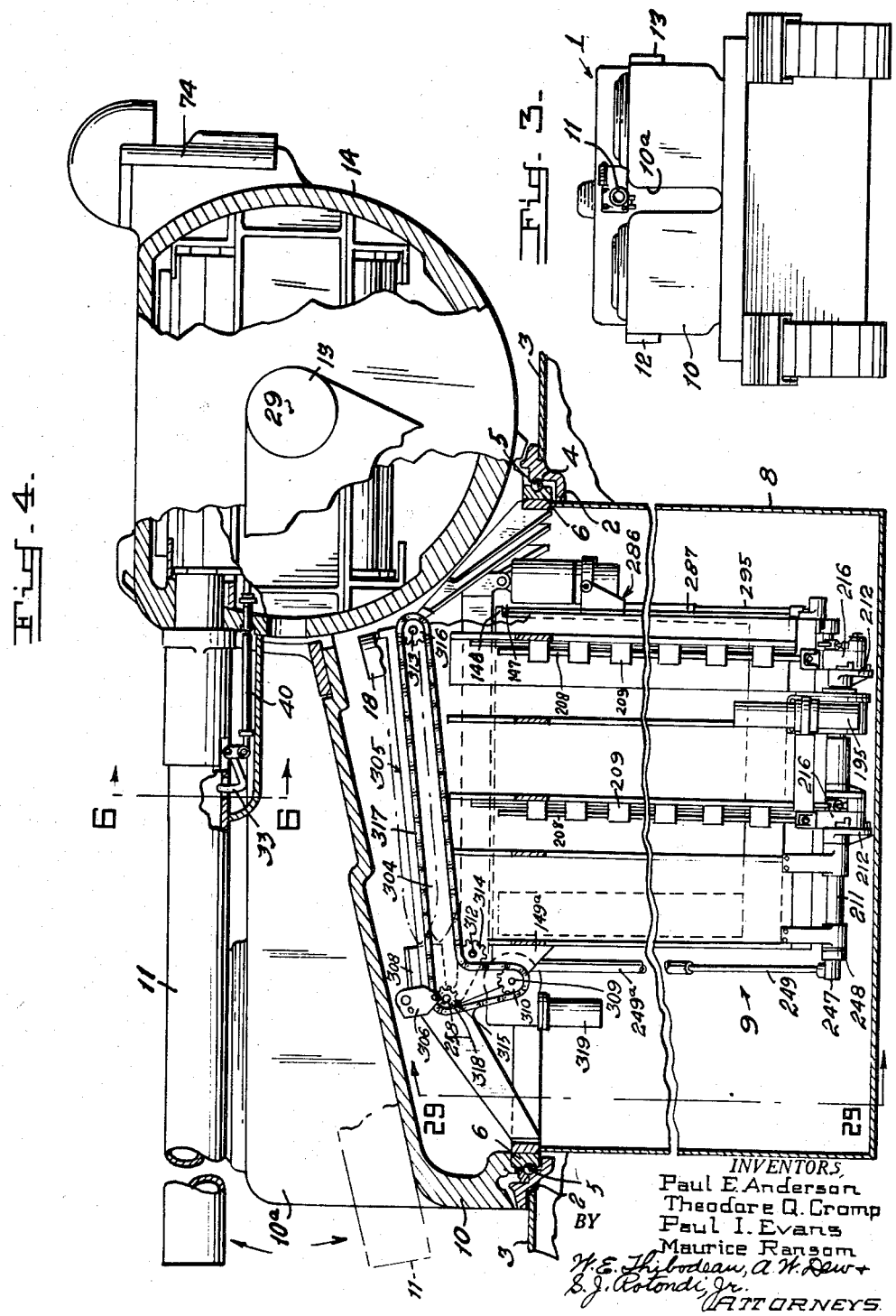

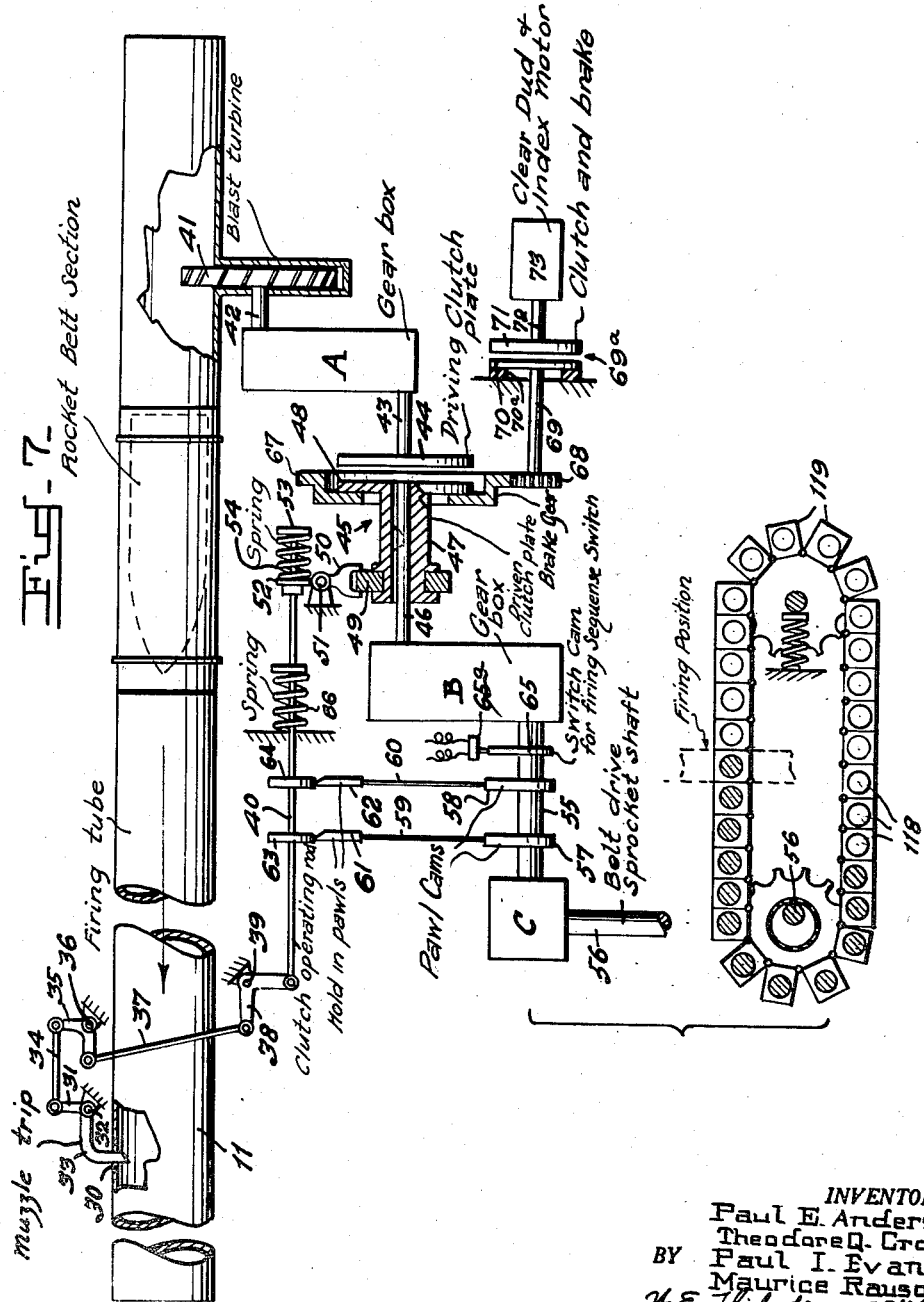

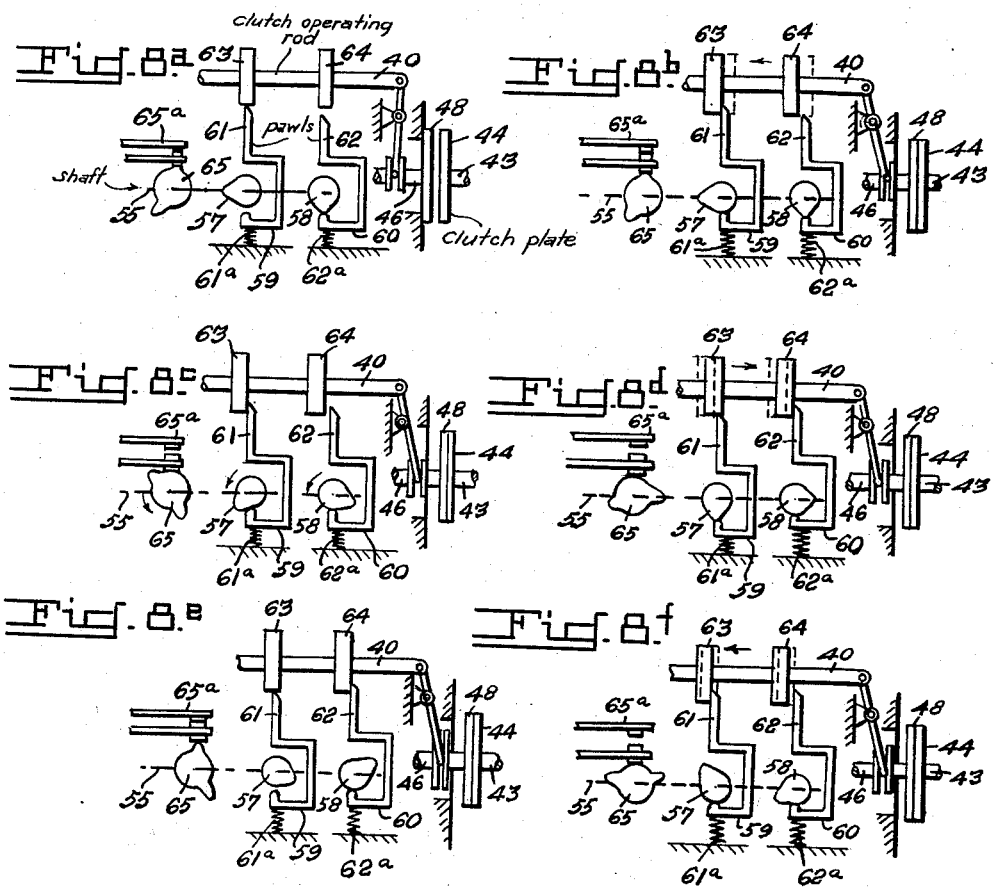

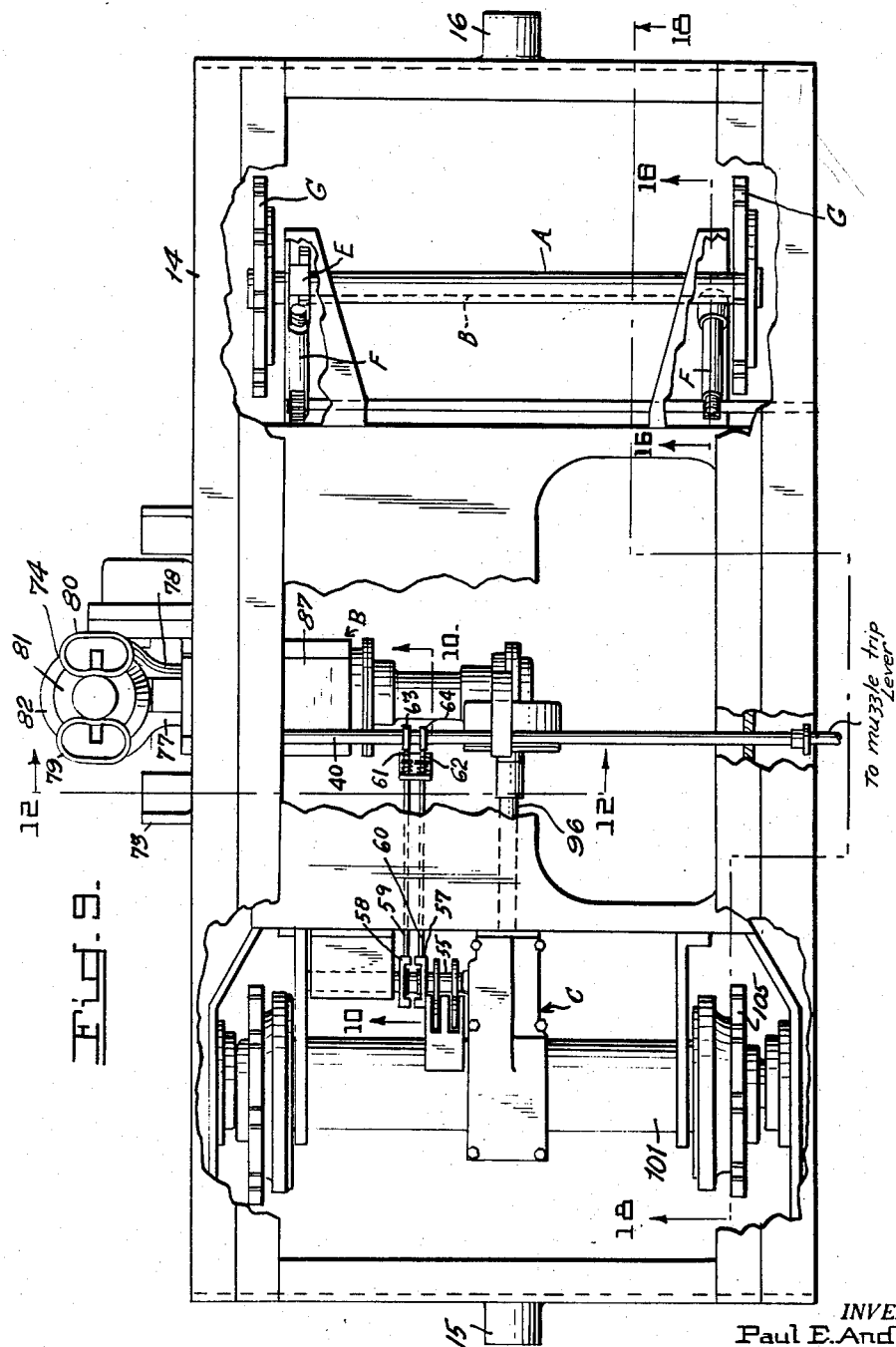

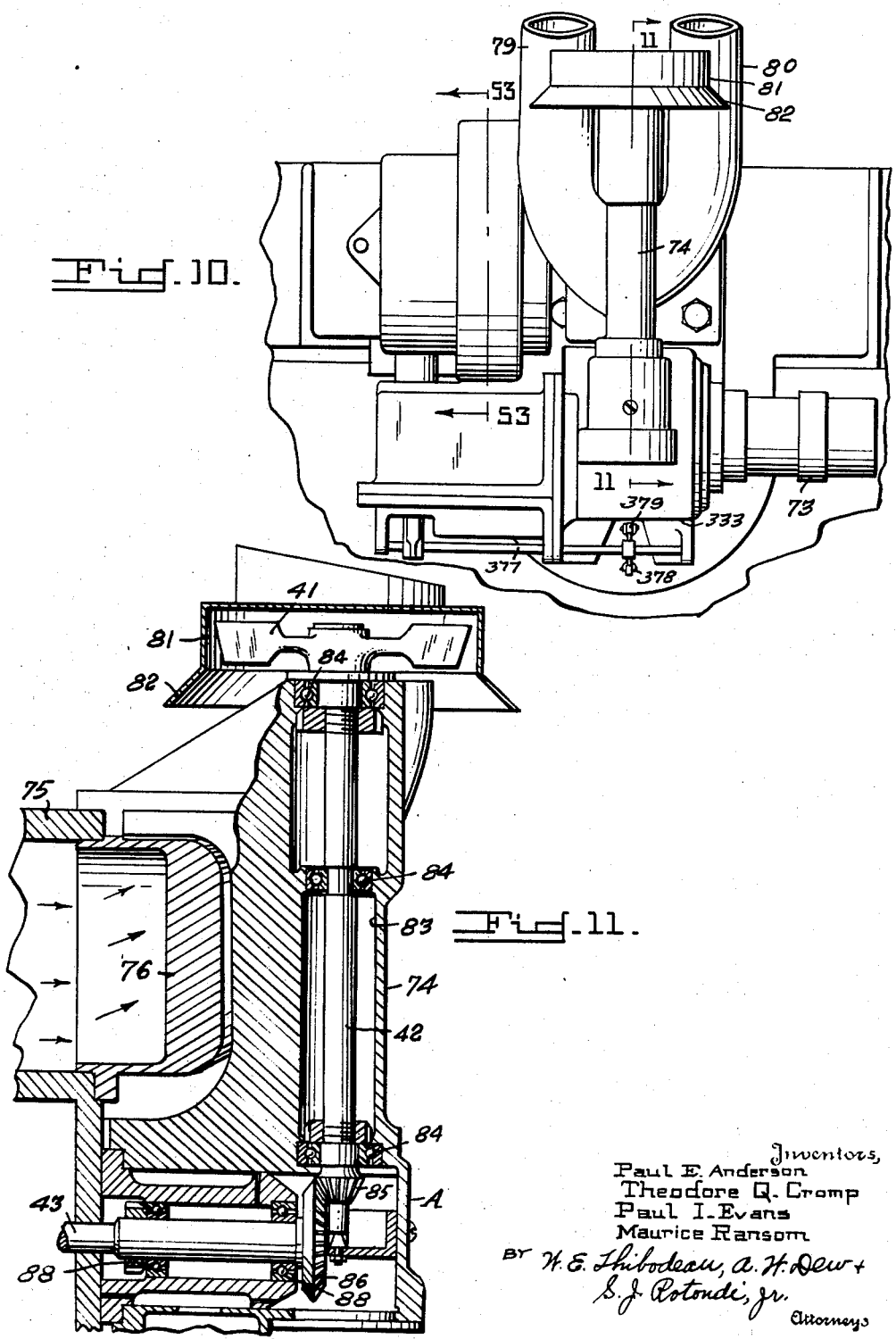

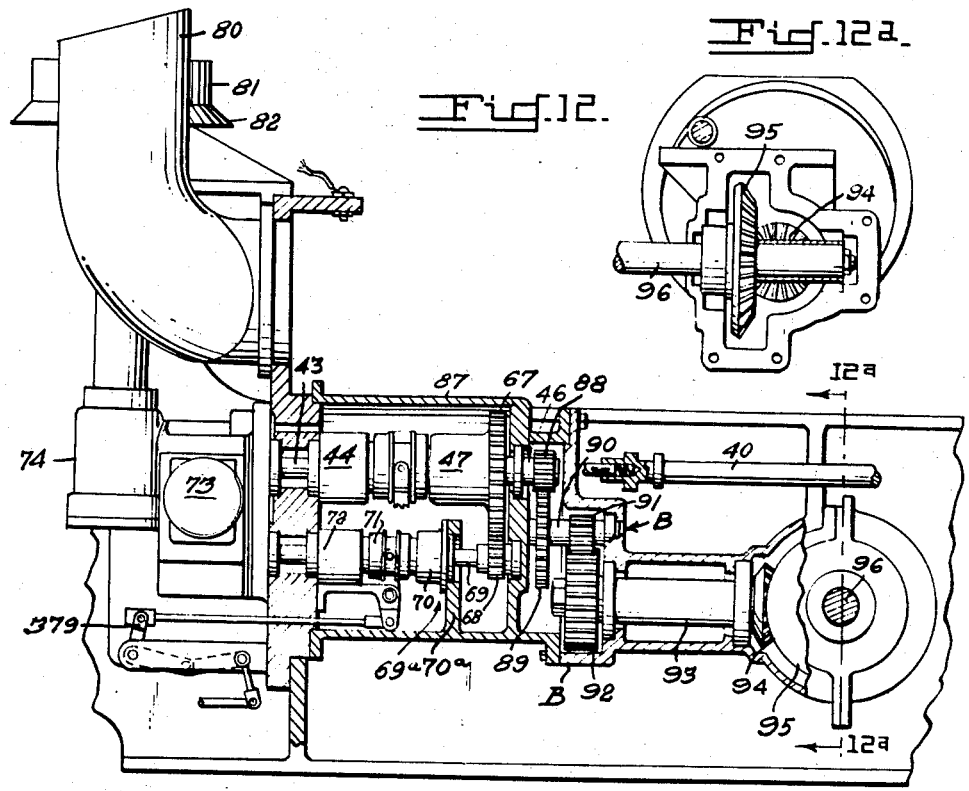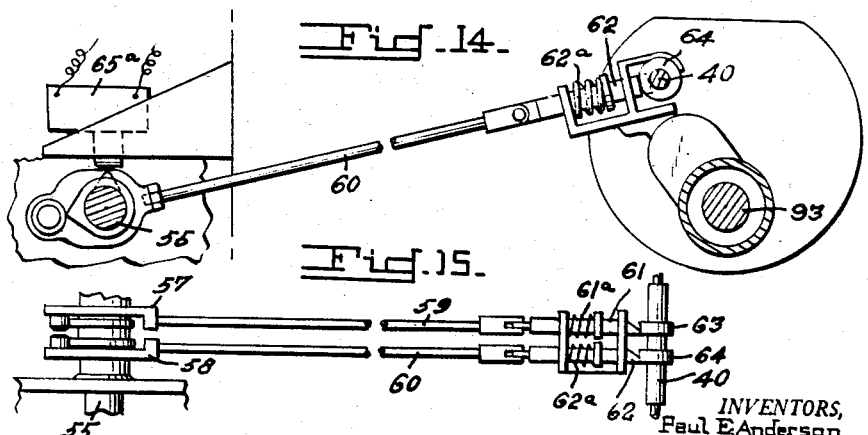

April 26, 1960 P. E. ANDERSON ET AL 2,933,981
AUTOMATIC REPEATING ROCKET LAUNCHER
Filed Oct. 26, 1953 25 Sheets-Sheet 9
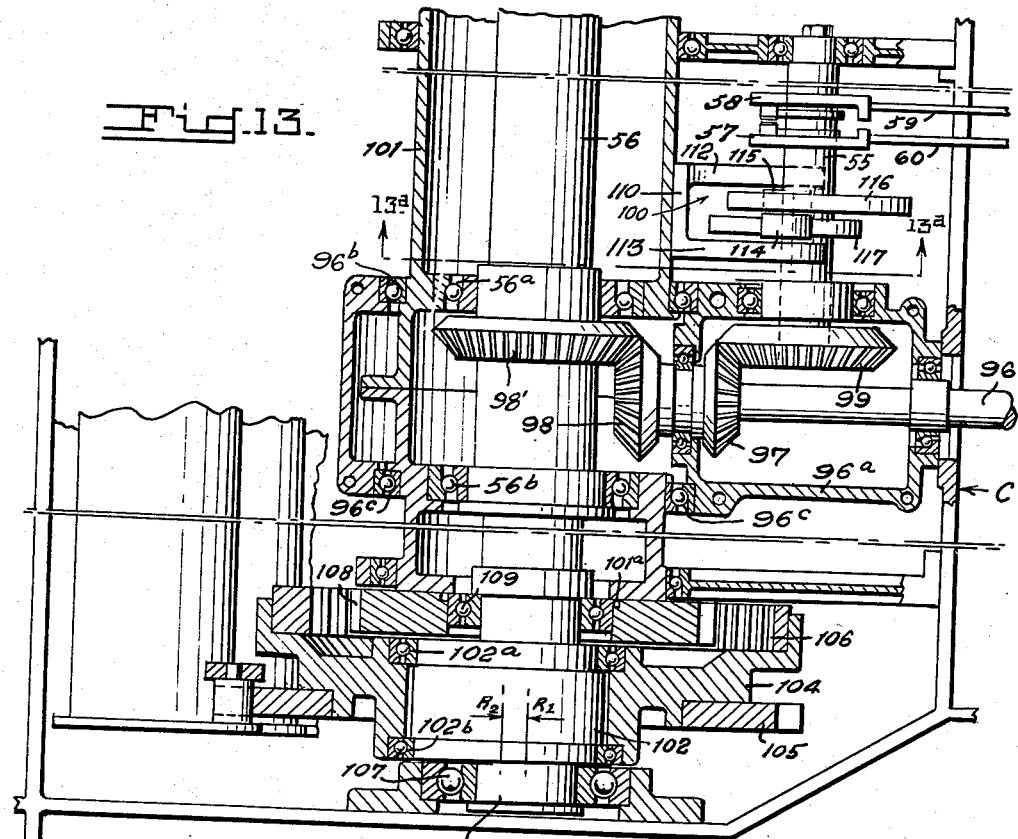
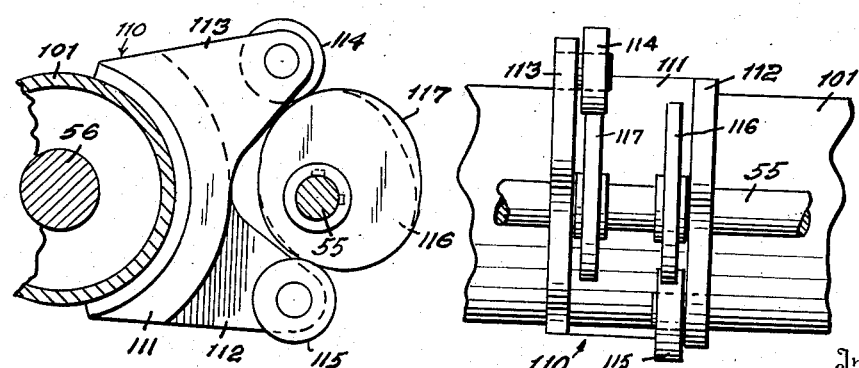
Inventors,
Paul E. Anderson
Theodore Q. Cromp
Paul I. Evans
Maurice Ransom
By H.E. Thibodeau, A.H. Dew+
L.J. Rotondi, Jr.
Attorneys

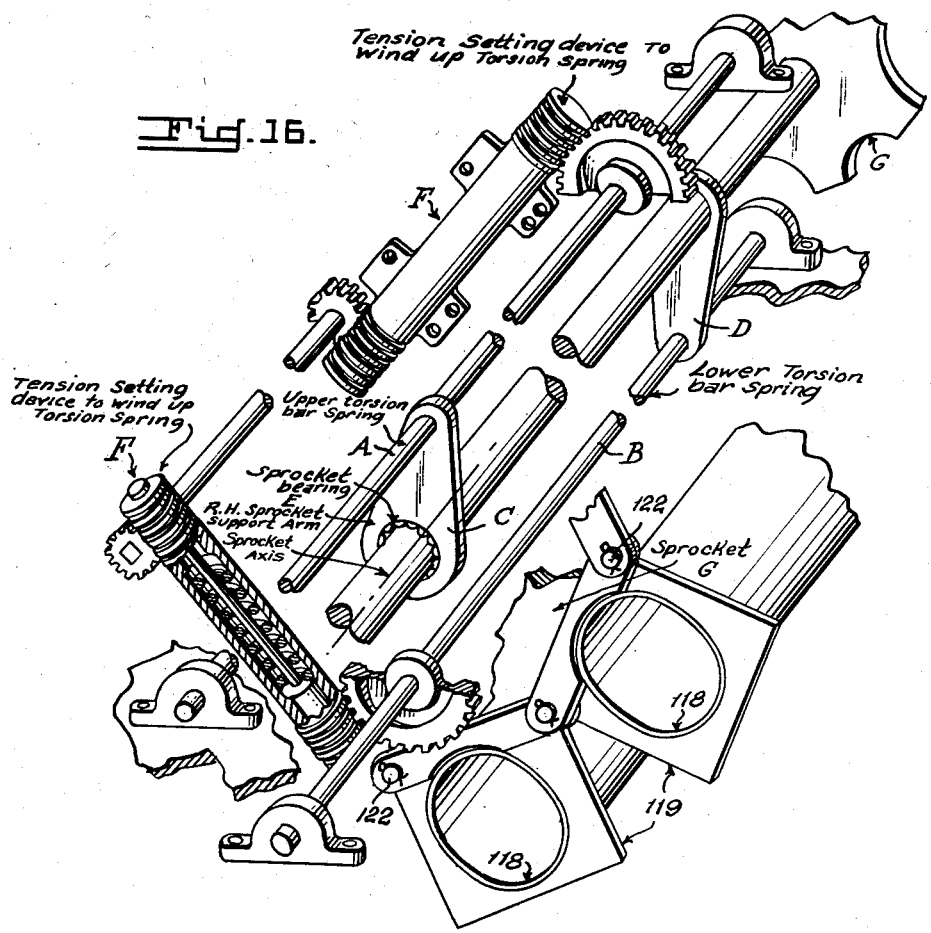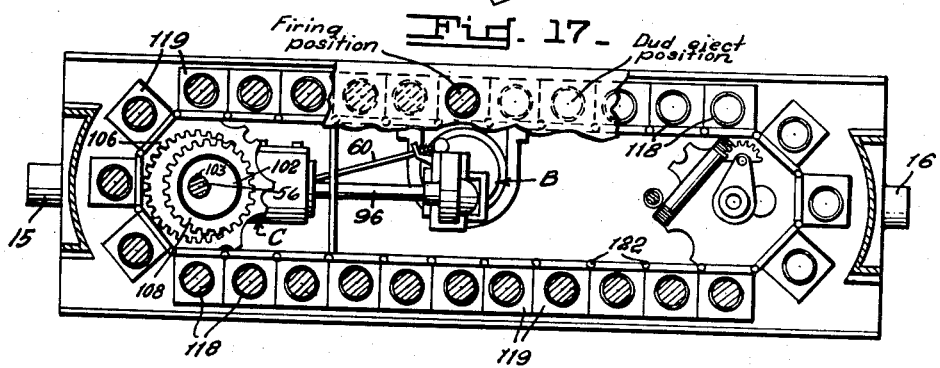

April 26, 1960  P. E. ANDERSON ET AL  2,933,981
AUTOMATIC REPEATING ROCKET LAUNCHER
Filed Oct. 26, 1953  25 Sheets-Sheet 11
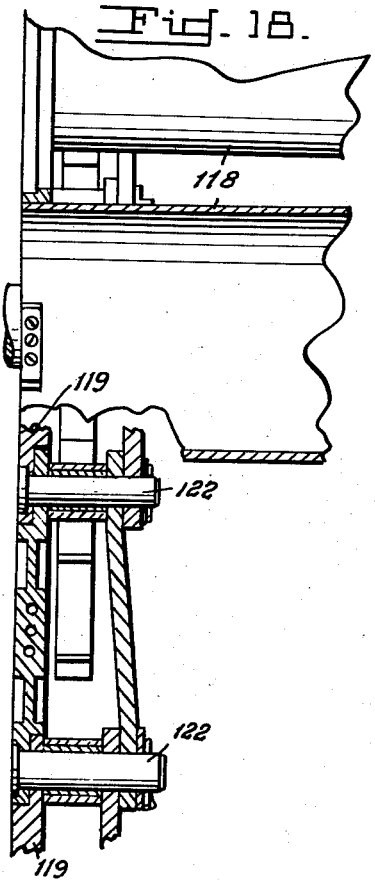
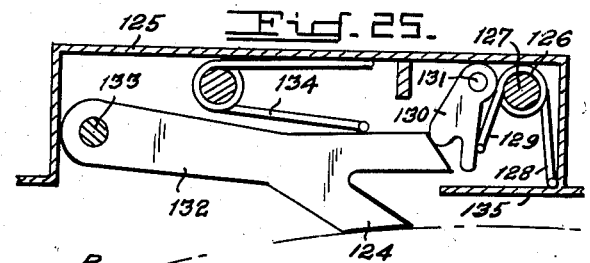
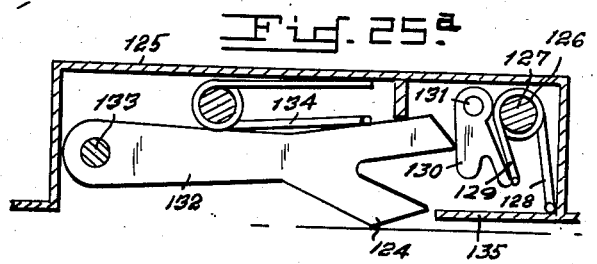
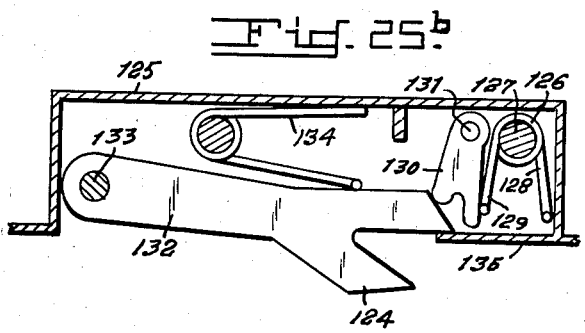
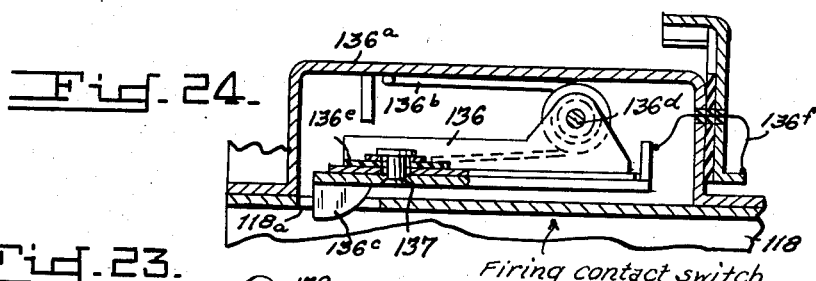
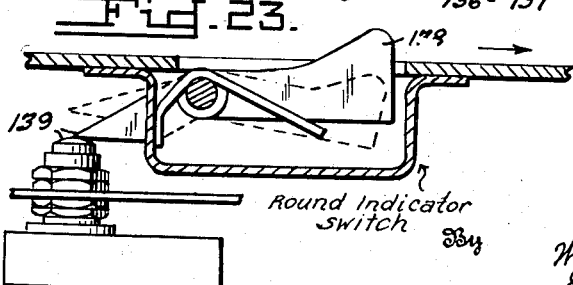
Inventors,
Paul E. Anderson
Theodore Q. Cromp
Paul I. Evans
Maurice Ransom
W.E. Thibodeau, A.H. Dew +
S.J. Rotondi, Jr.
Attorneys

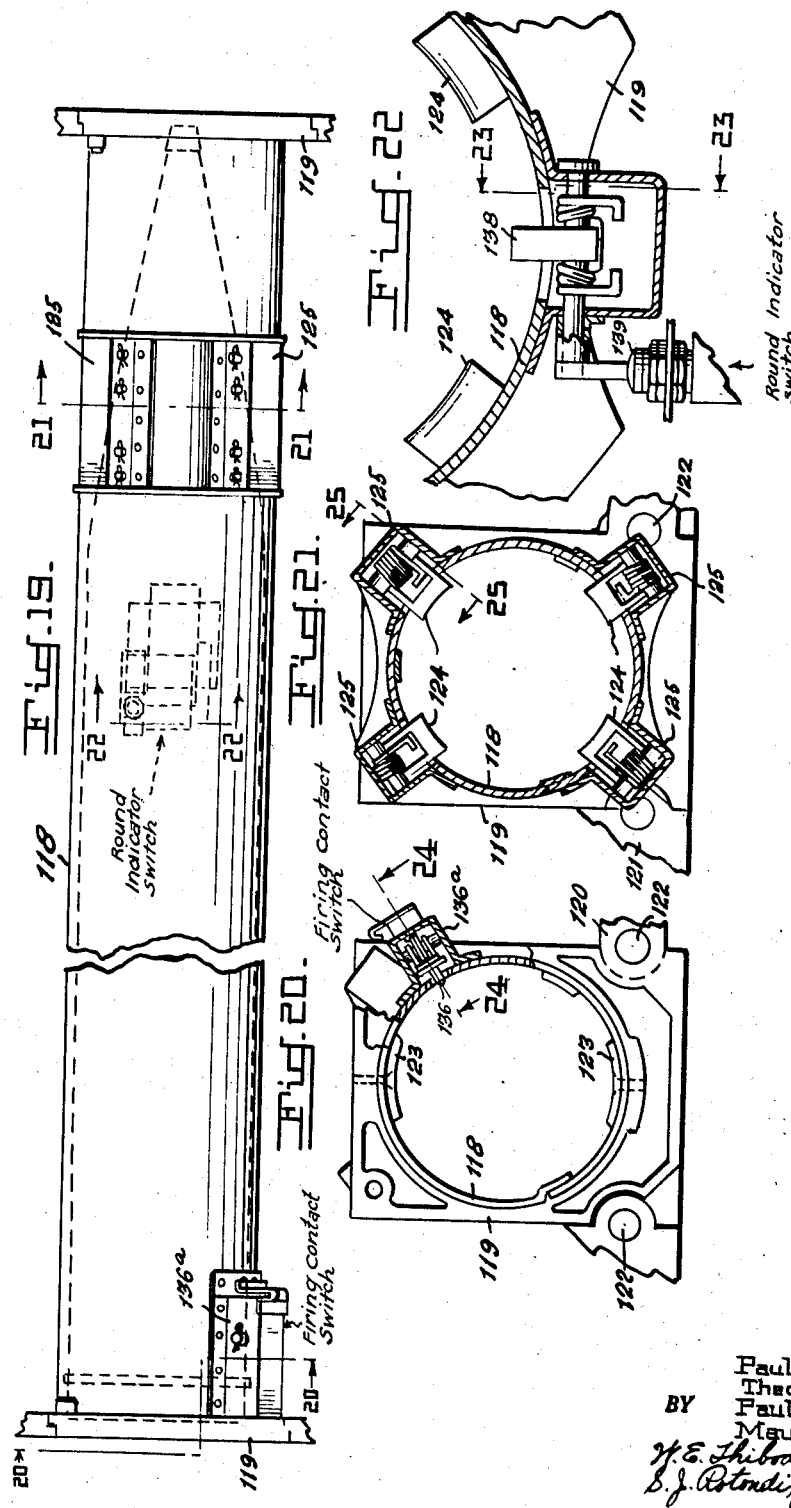

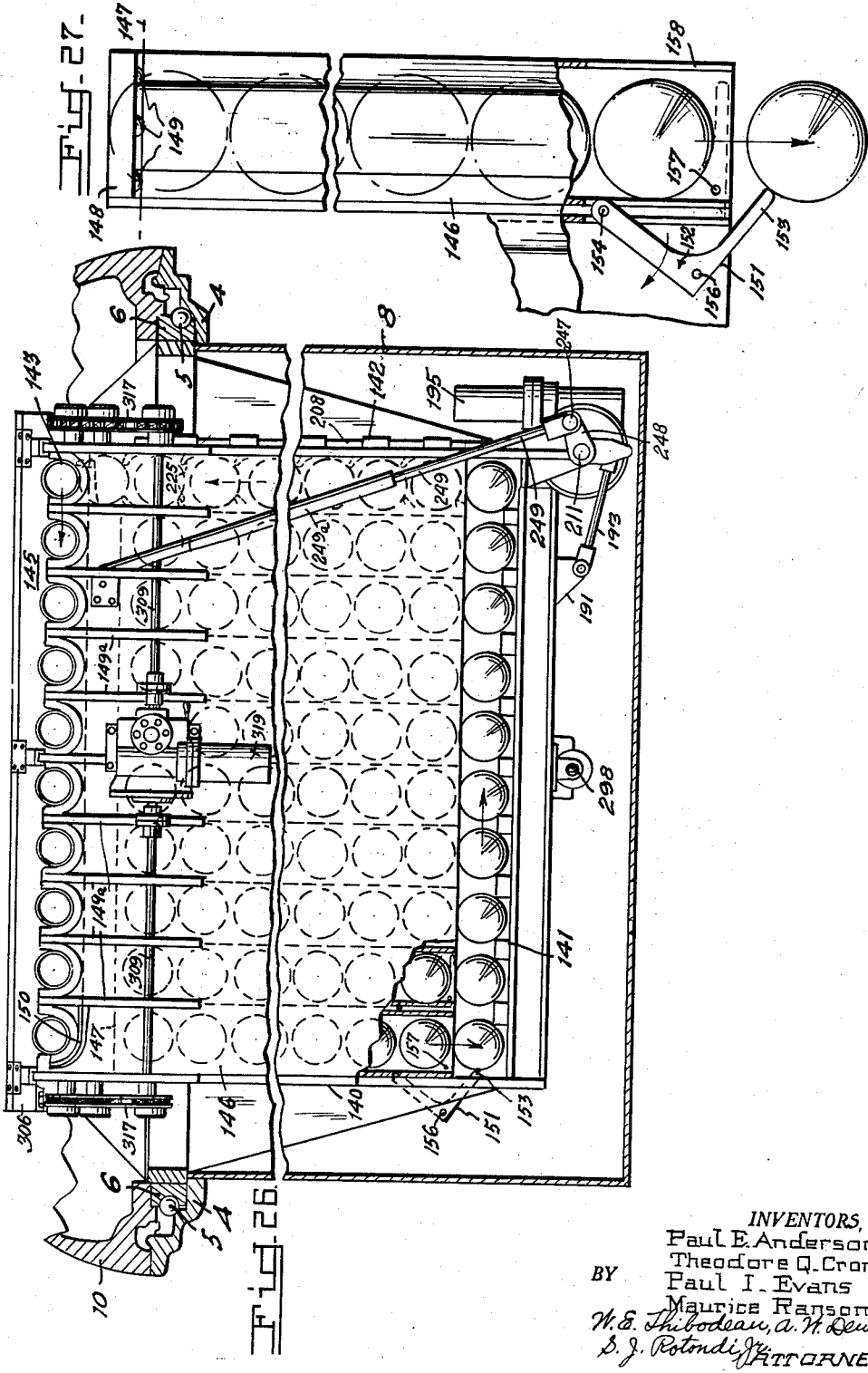

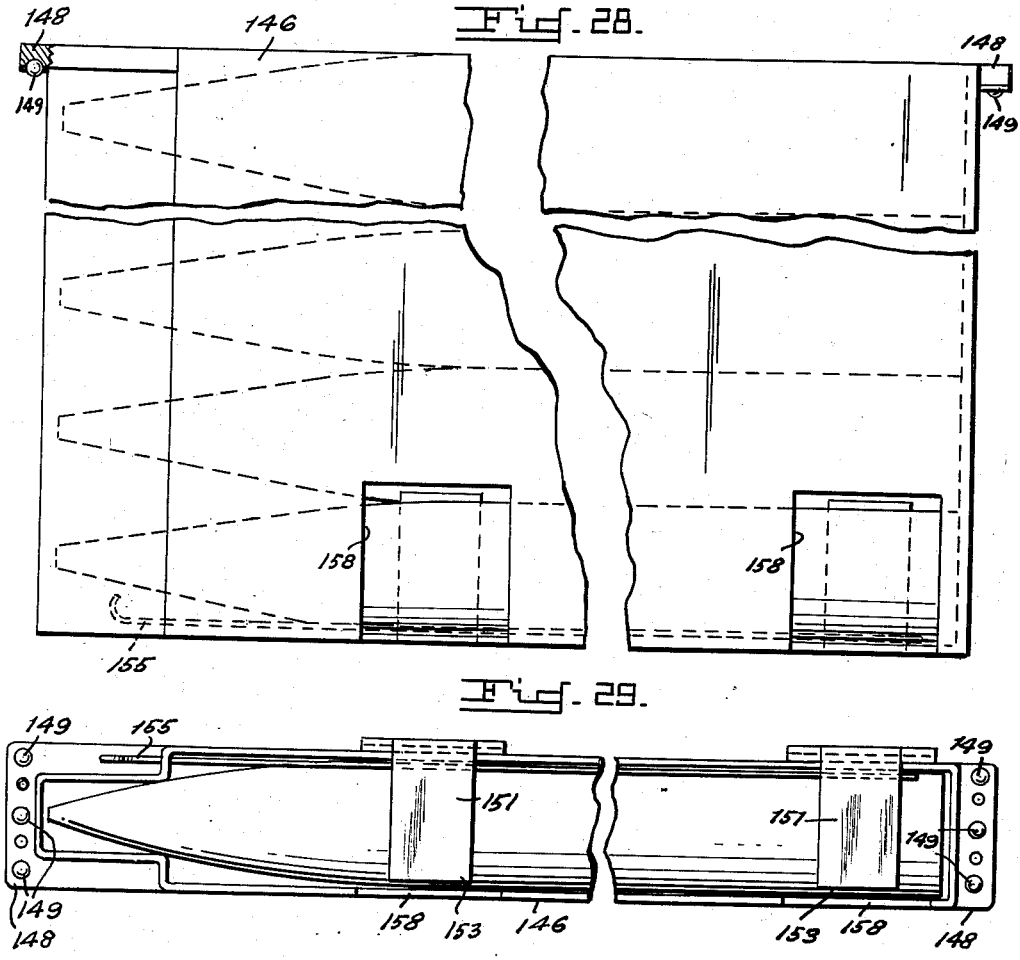

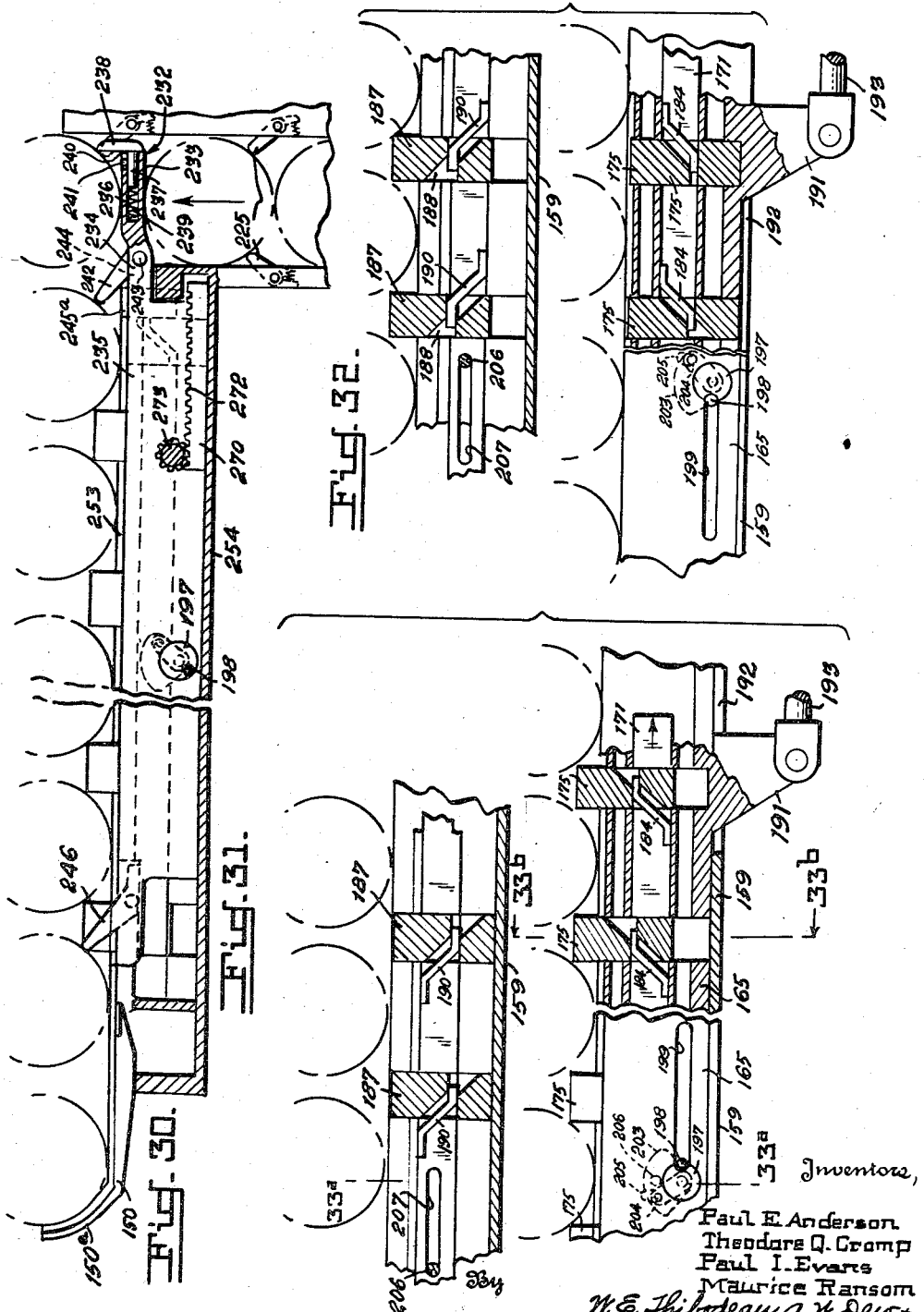

April 26, 1960 P. E. ANDERSON ET AL 2,933,981
AUTOMATIC REPEATING ROCKET LAUNCHER
Filed Oct. 26, 1953 25 Sheets-Sheet 16
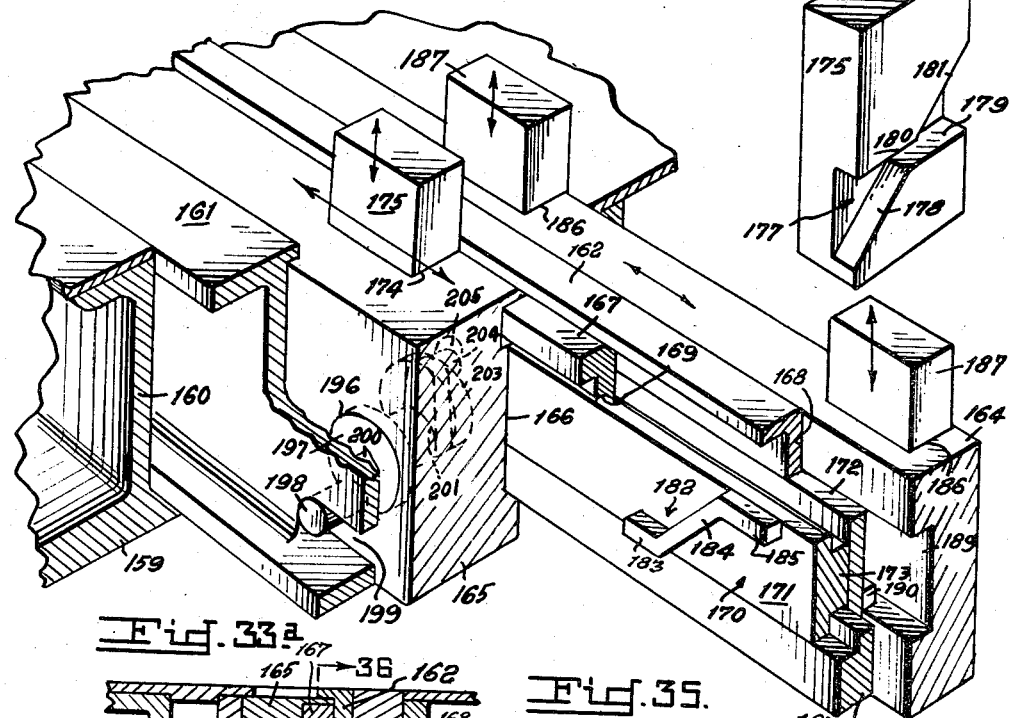
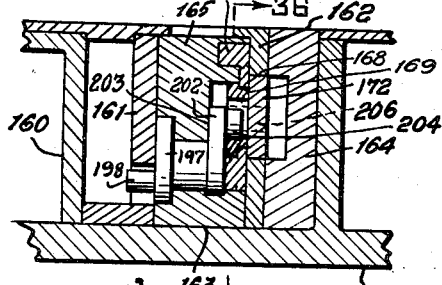
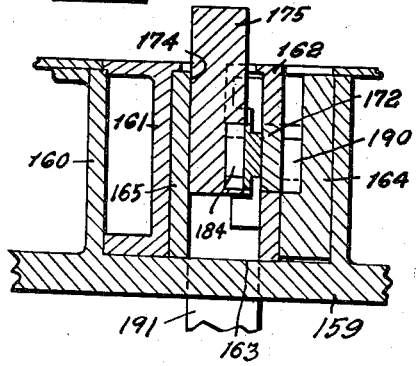
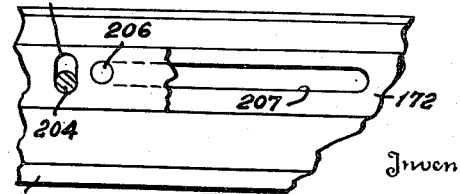
Inventors,
Paul E. Anderson
Theodore Q. Cromp
Paul I. Evans
Maurice Ransom
By W.E. Thibodeau, A.W. Dew + B.J. Rotondi, Jr. Attorneys

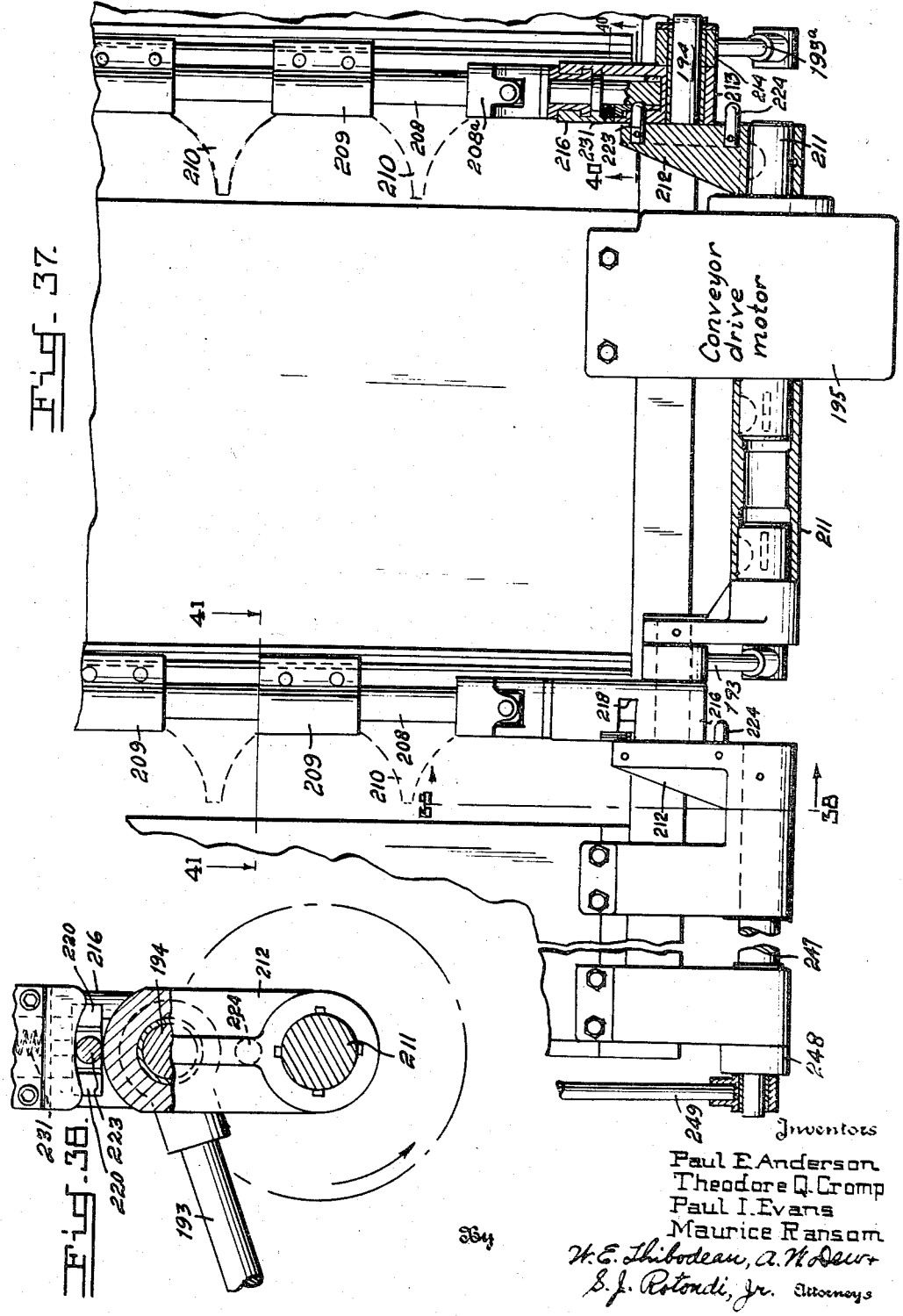

April 26, 1960  P. E. ANDERSON ET AL  2,933,981
AUTOMATIC REPEATING ROCKET LAUNCHER
Filed Oct. 26, 1953  25 Sheets-Sheet 18
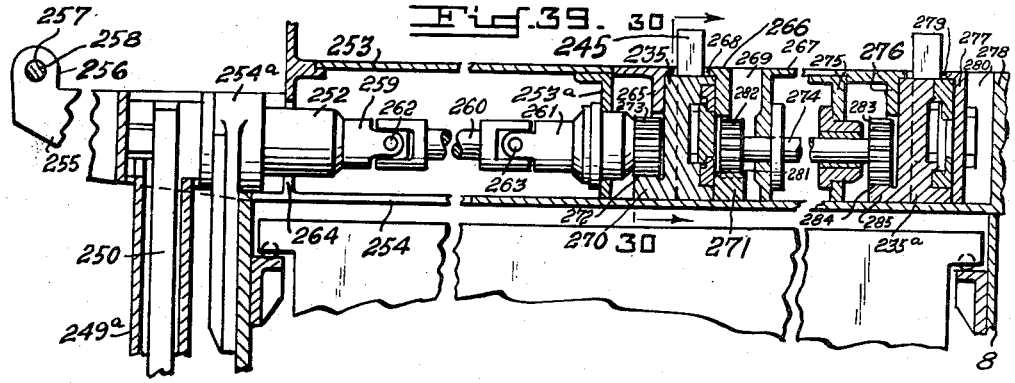
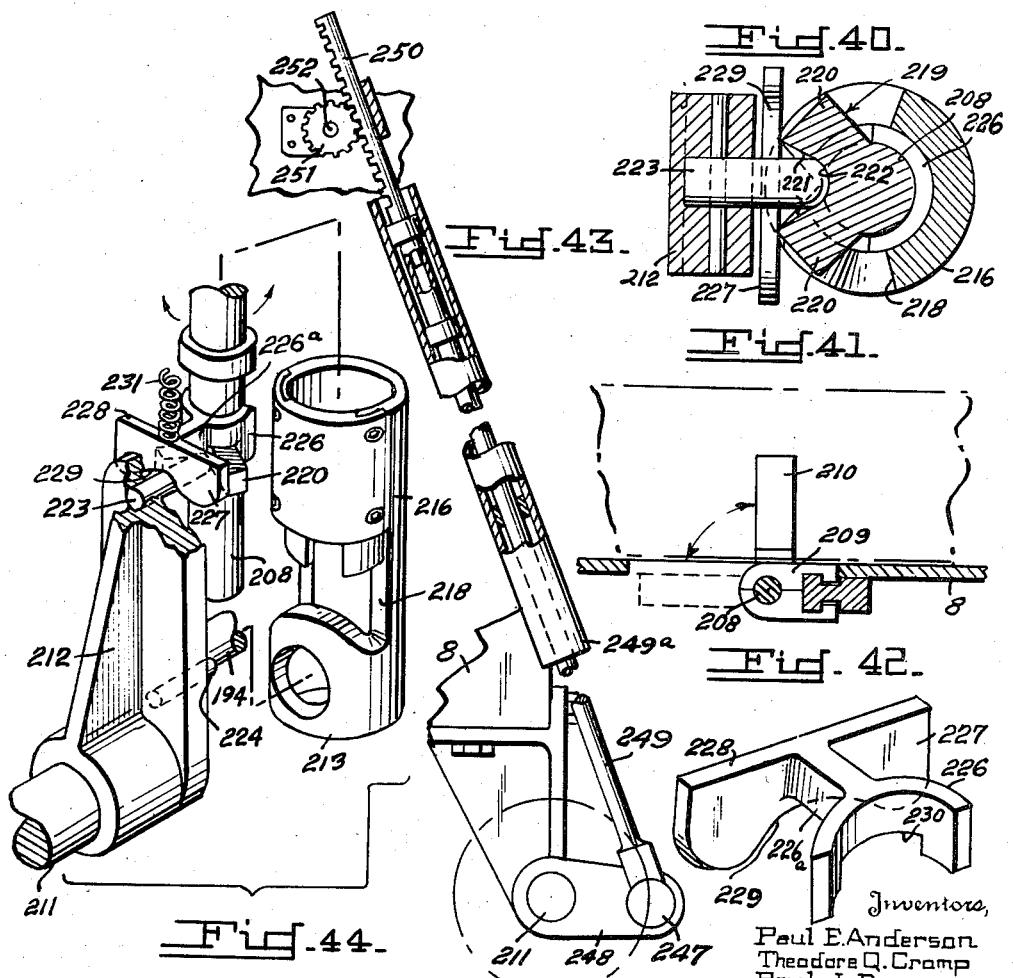
Inventors,
Paul E. Anderson
Theodore Q. Cramp
Paul I. Evans
Maurice Ransom
By
W. E. Thibodeau, A. W. Dew &
S. J. Rotondi, Jr.  Attorneys

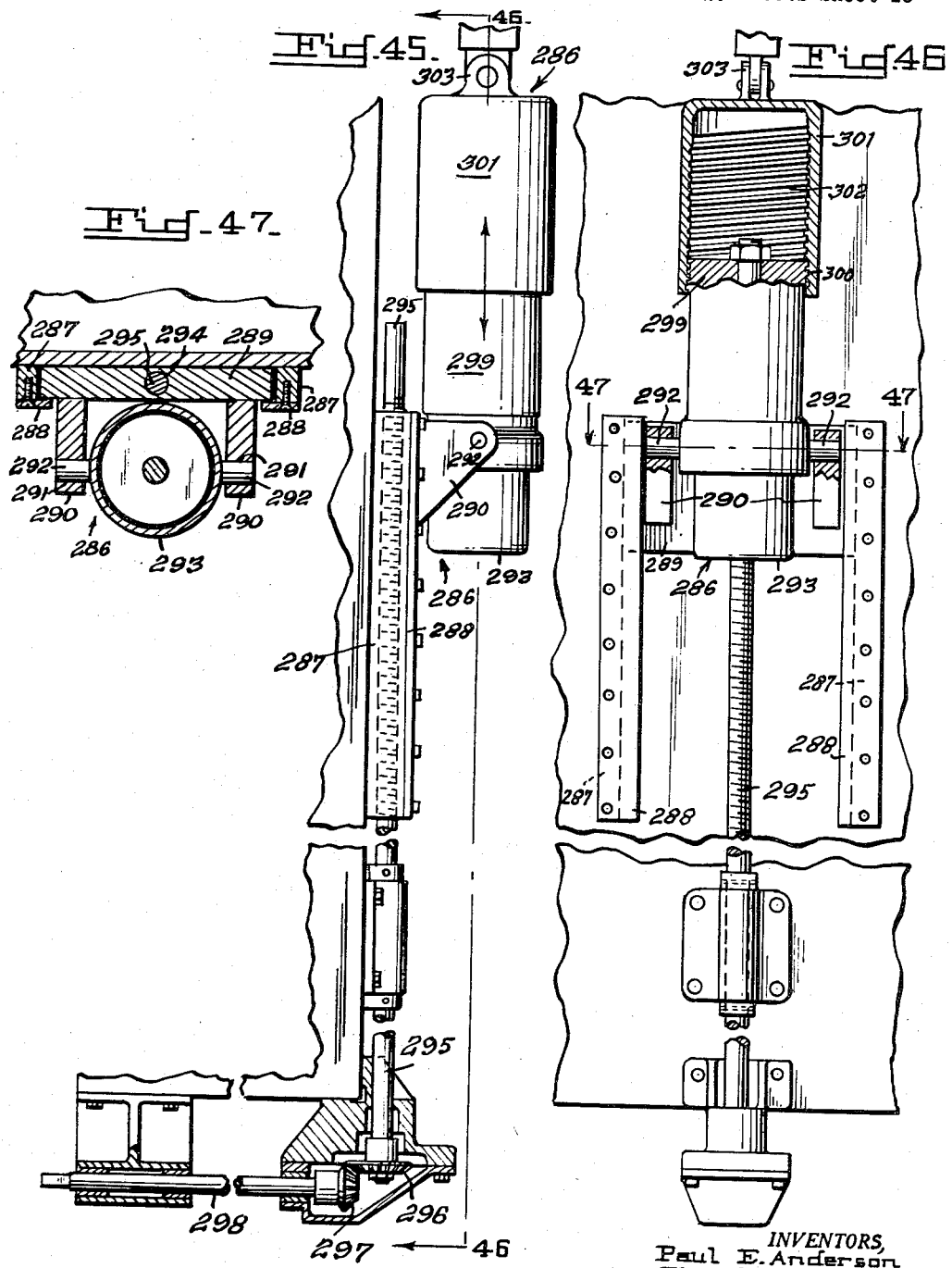

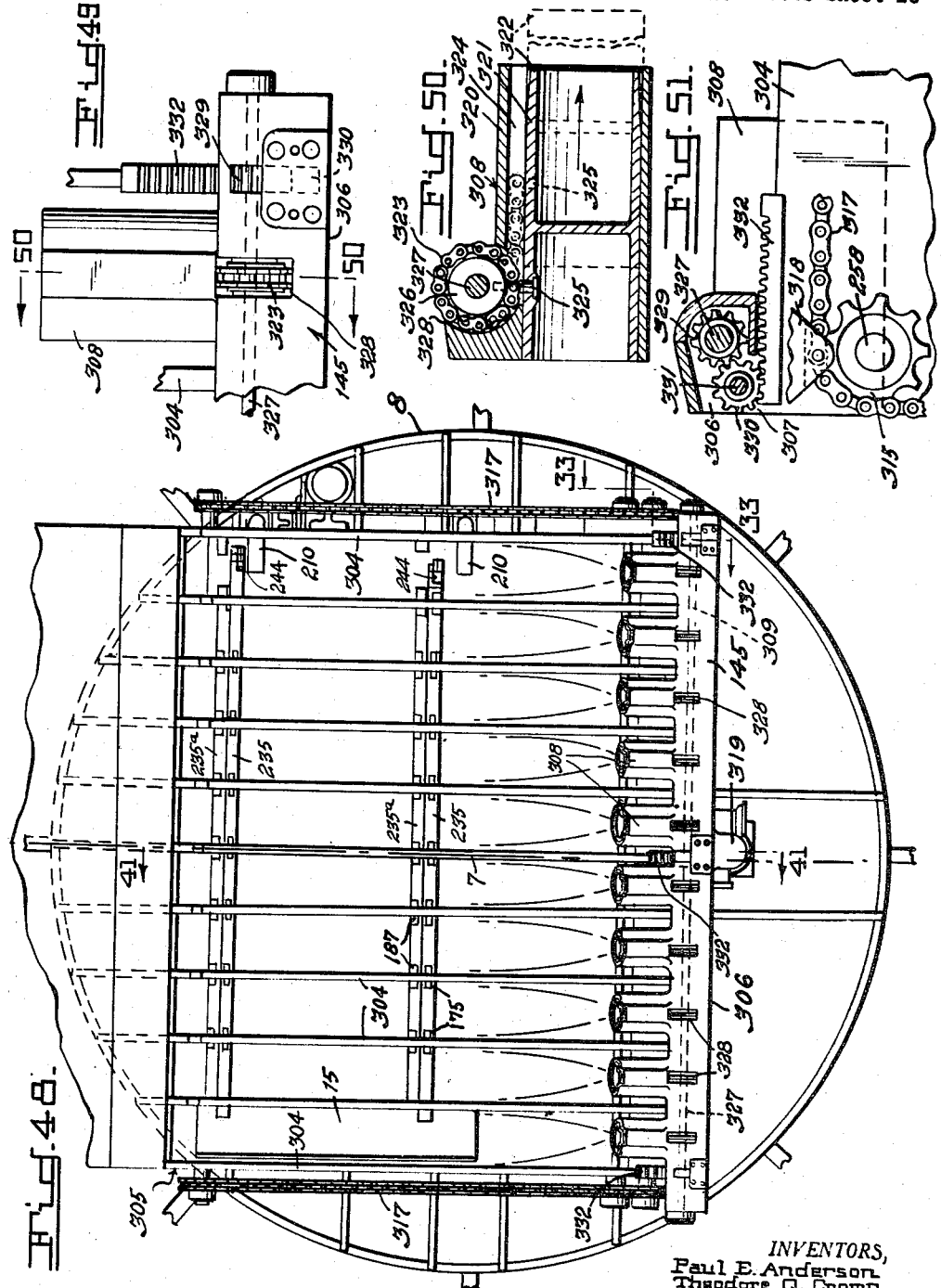

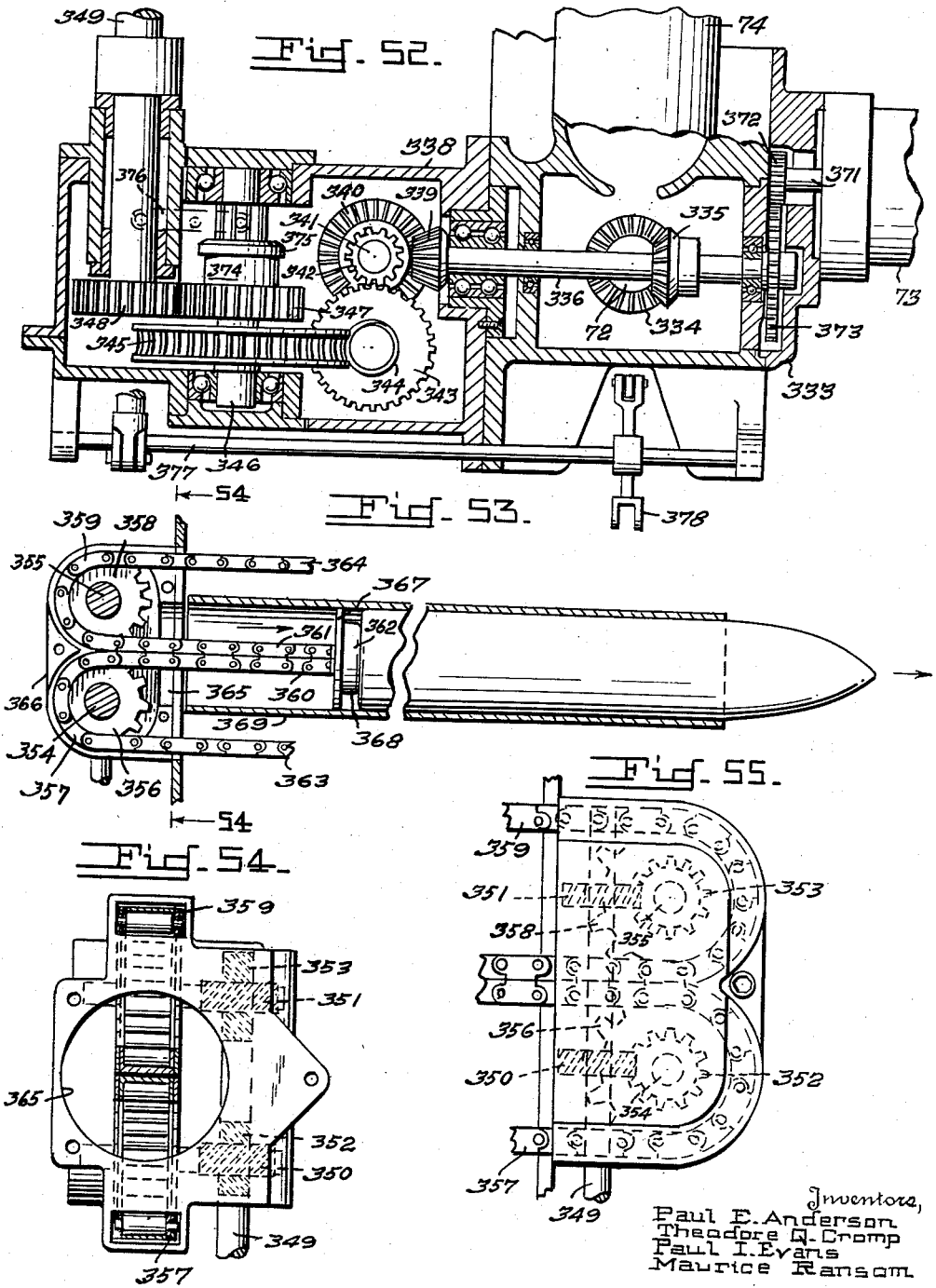

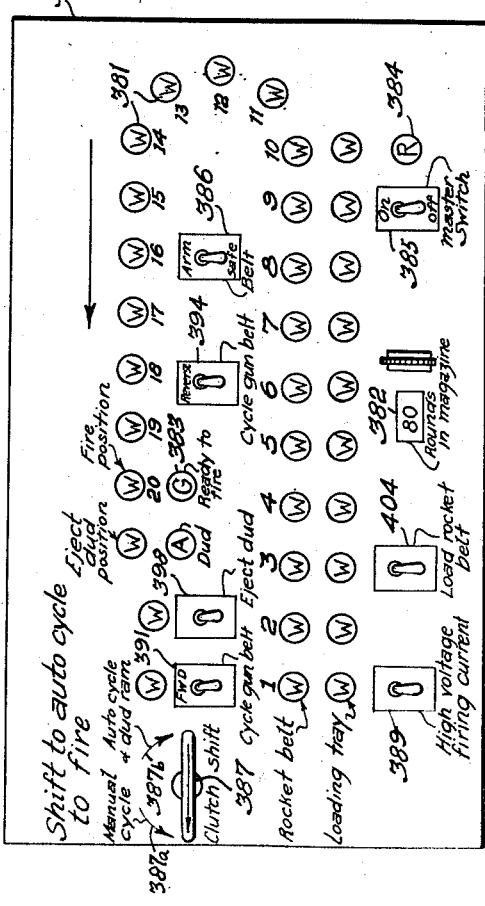

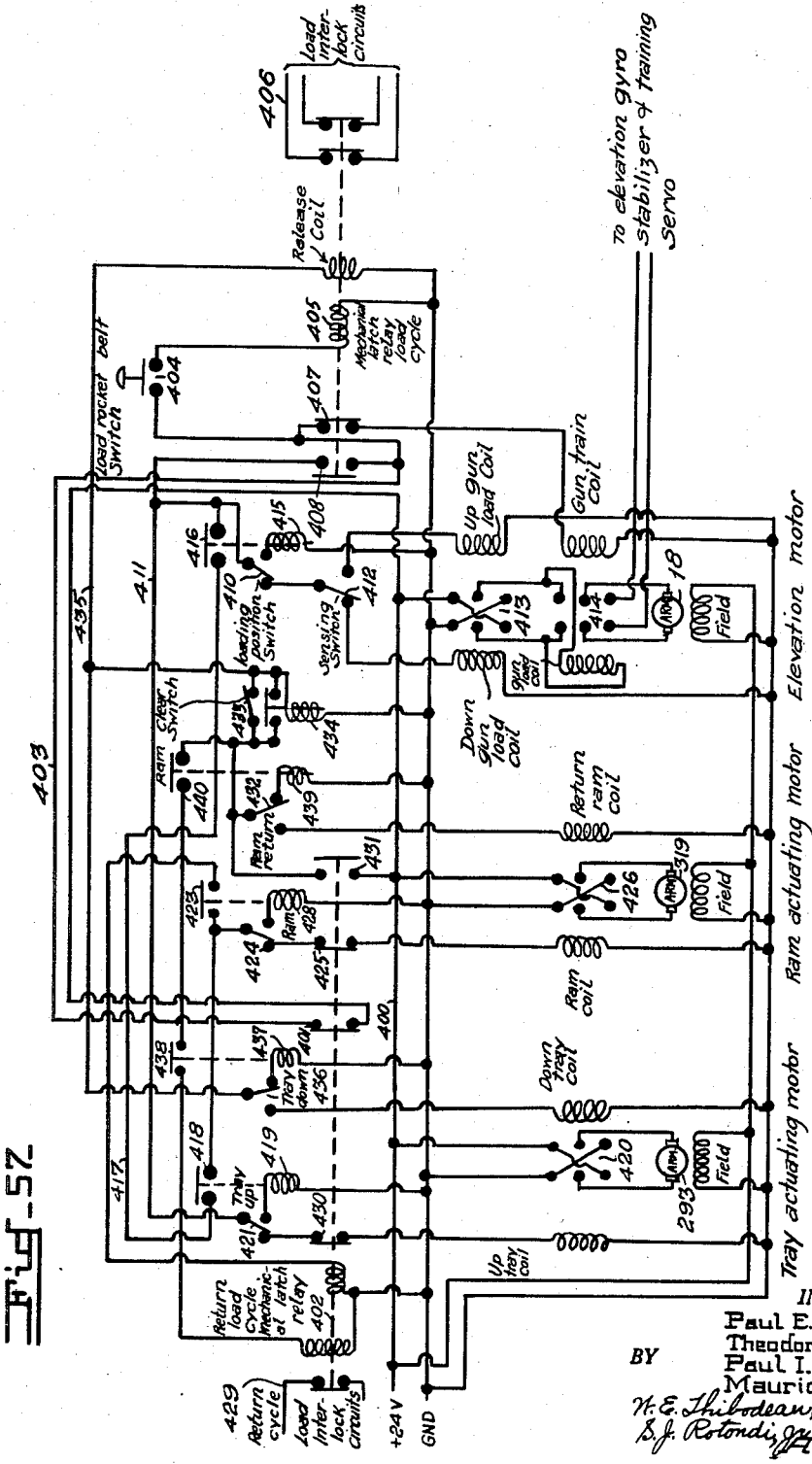

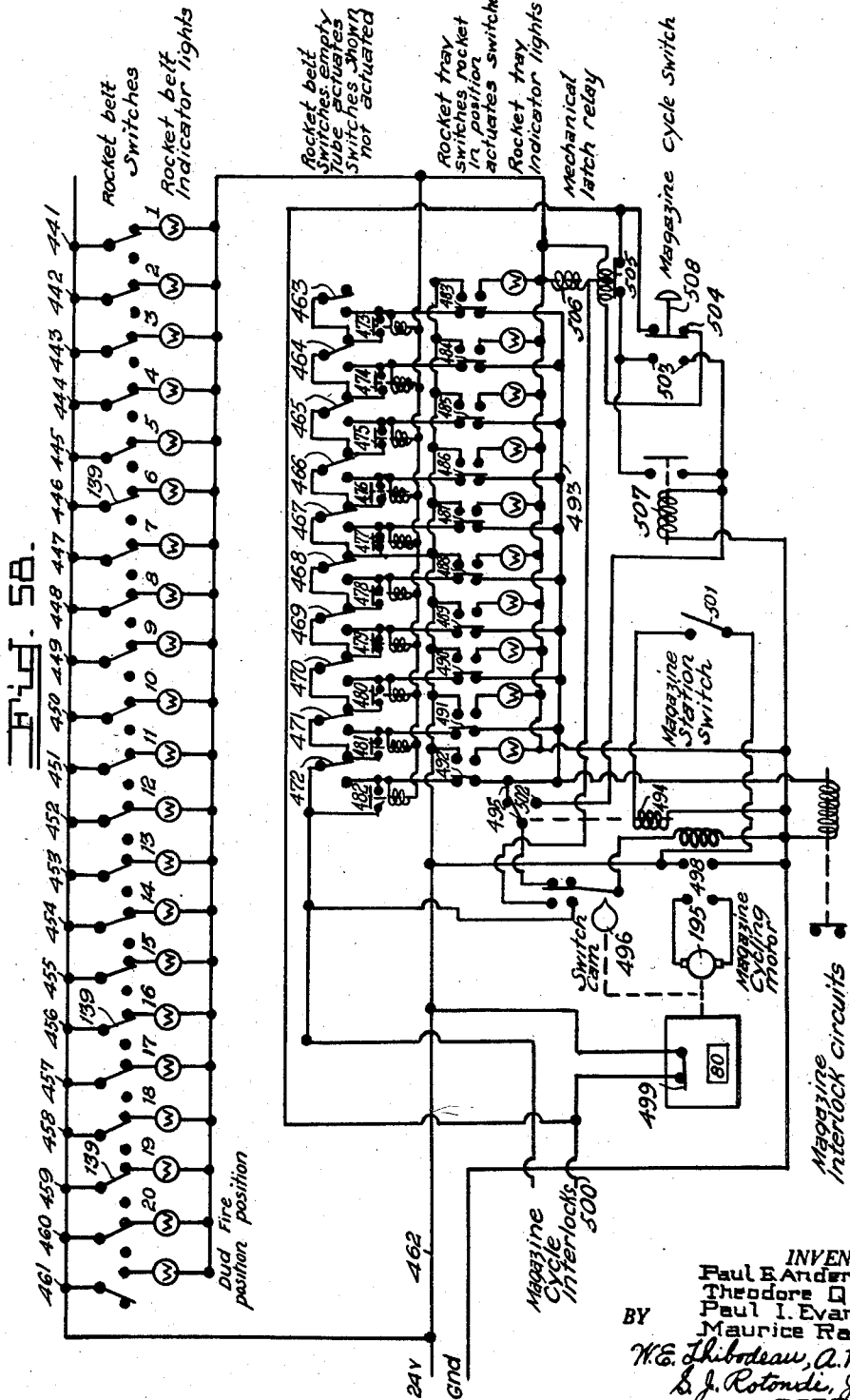

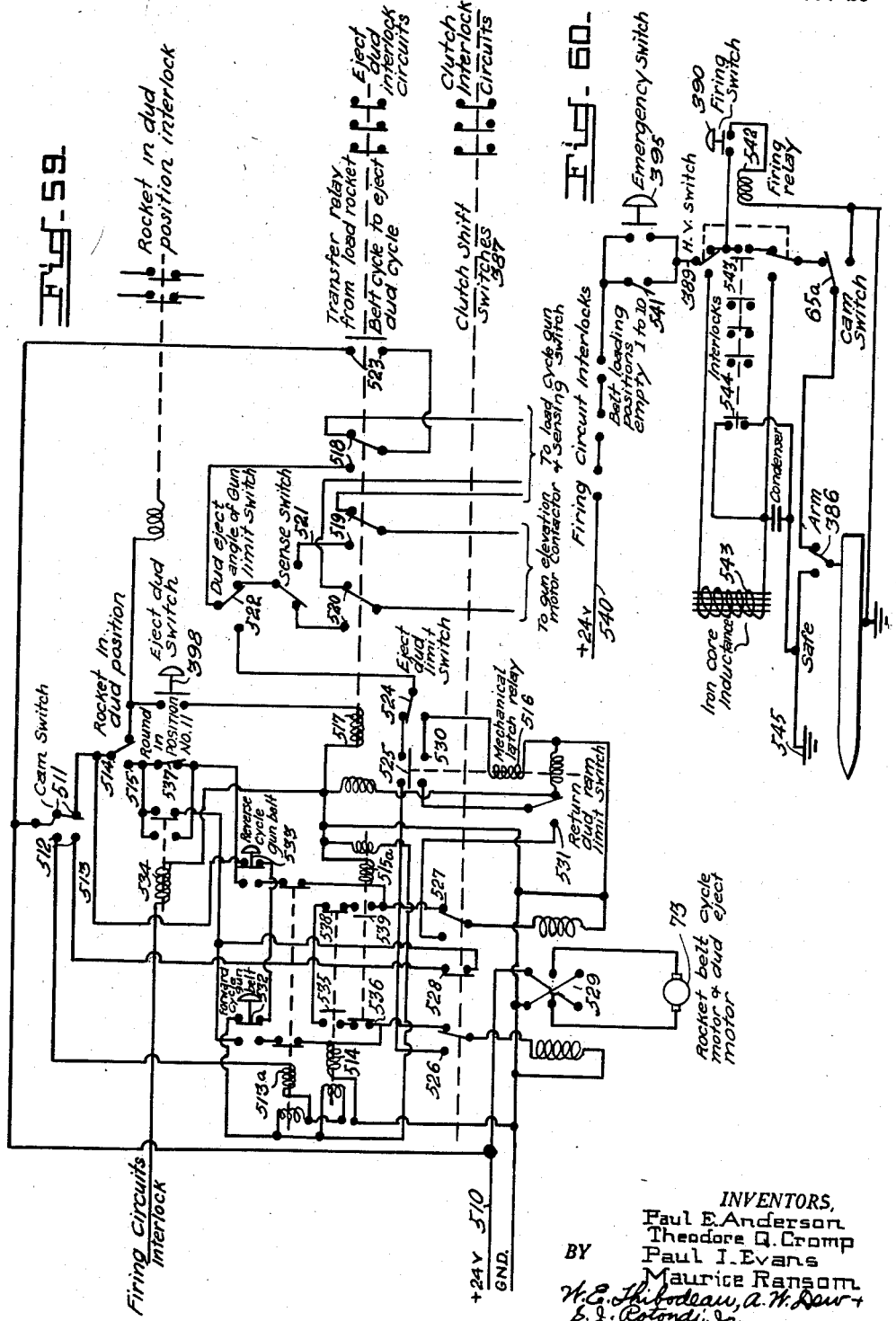

United States Patent Office 2,933,981
Patented Apr. 26, 1960

2,933,981
AUTOMATIC REPEATING ROCKET LAUNCHER

Paul E. Anderson, Torrance, Theodore Q. Cromp, San Pedro, Paul I. Evans, Long Beach, and Maurice Ransom, Torrance, Calif., assignors to the United States of America as represented by the Secretary of the Army Application October 26, 1953, Serial No. 388,466

22 Claims. (Cl. 89—1.7)

This invention relates to a single barrel, high speed rocket launcher of the automatic repeating type. More particularly the invention relates to a rocket launcher for the rapid, automatic launching and handling of large caliber rockets at rates of fire heretofore considered unattainable with heavy rockets fired from a single barrel weapon.

It is the primary object of the invention to provide a launcher of the aforesaid type capable of rapid and sustained fire of rockets in succession from a single launcher tube.

Another object is the provision of a launcher wherein the launching tube and loading mechanism are power driven for rapid arming in train and elevation.

A further object is to provide a fully automatic loader using a belt feed actuated by a unique planetary gear mechanism whereby the upper section of the belt is driven in intermittent motion to provide a "dwell" period to accommodate the firing cycle while the lower portion of the belt is moved at nearly constant velocity to facilitate loading and firing.

A still further object of this invention is to provide a single barrel, high speed automatic launcher which, in effect, combines the fire power of a cluster type launcher with the invulnerability and maneuverability of a single shot weapon.

Yet another object is to provide a launcher of the aforesaid type which, when mounted on a vehicle, achieves a low silhouette to thereby present a minimum target while at the same time lowering the center of gravity to provide maneuverability.

With these and other objects in view which will become apparent as the specification develops, reference is made to drawing forming a part of the specification wherein:

Figure 1 is a side elevation, partly in section, of a combat tank equipped with the rocket launcher and showing the launcher tube in solid lines at zero elevation and in dotted lines at about 60° elevation, and at about −15° depression while stowed.

Figure 2 is a plan view corresponding to Figure 1.

Figure 3 is a front elevation corresponding to Figure 1.

Figure 4 is a longitudinal vertical section to an enlarged scale, of the breech portion of the launcher and parts of the automatic loading mechanism.

Figure 5 is a detail view, partly in section, of the power drive for controlling elevation of the launcher tube.

Figure 6 is a front elevation showing the trunnion mount for the launcher and indicating in dotted lines the belt for feeding rockets in succession to the tube for launching.

Figure 7 is a schematic diagram to illustrate the general operation of the gun mechanism.

Figures 8a to 8f are diagrammatic sketches of the rocket responsive muzzle lever control system with parts in various stages of operation.

Figure 9 is a top plan view of the rocket belt drive.

Figure 10 is a rear elevation of the launcher with armor shield removed and showing the turbine blast tubes.

Figure 11 is a sectional view taken on line 11—11 of Figure 10.

Figure 12 is a sectional view taken on line 12—12 of Figure 9, and showing blast operated turbine reduction gearing.

Figure 12a is a section taken on line 12a—12a of Figure 12.

Figure 13 is a sectional detail view of the belt sprocket power drive for controlling the planetary gearing to provide intermittent motion to the gun belt.

Figure 13a is a section taken on line 13a—13a of Figure 13.

Figure 13b is a side elevation looking to the left of Figure 13a.

Figures 14 and 15 are fragmentary detail views of the clutch actuating rod and linkage.

Figure 16 is a fragmentary detail view on line 16—16 of Fig. 9 of the spring biased gun belt idler shaft control.

Figure 17 is a front elevation of the gun belt looking toward the rear of the launcher.

Figure 18 is a fragmentary sectional detail of the linkage for connecting the gun belt tubes.

Figure 19 is a top plan, partly in section of one of the gun belt tubes.

Figures 20, 21 and 22 are transverse sections taken on lines 20—20, 21—21 and 22—22 respectively of Figure 19.

Figure 23 is a section taken on line 23—23 of Figure 22 showing details of the light indicator switch.

Figure 24 is a section taken on line 24—24 of Figure 20 showing details of the firing contactor switch.

Figures 25, 25a, and 25b are sections taken on line 25—25 of Figure 21 showing rocket detent mechanism in various positions of operation.

Figure 26 is a front view partly in section of the storage magazine and feeding conveyors.

Figure 27 is a front elevation, partly in section of magazine clip.

Figure 28 is a side elevation of the magazine clip.

Figure 29 is a bottom plan view of the magazine clip.

Figure 30 is a longitudinal vertical section of the traversing spacer portion only of the upper conveyor, taken on line 30—30 of Figure 39, fixed spacer details being similar to those shown in lower conveyor.

Figure 31 is a sectional view of lower conveyor details showing traveling spacer blocks projected and fixed spacer blocks withdrawn.

Figure 32 is a view similar to Figure 31 showing traveling spacer blocks withdrawn and fixed spacer blocks projected.

Figure 33 is a fragmentary isometric view showing typical conveyor details.

Figure 33a is a section taken on line 33a—33a of Figure 31.

Figure 33b is a section taken on line 33b—33b of Figure 31.

Figure 34 is an isometric of a typical spacer block.

Figure 35 is a fragmentary isometric detail of the bell crank member for actuating the conveyor cam bars.

Figure 36 is a section taken on line 36—36 of Figure 33a.

Figure 37 is a detail elevation, partly in section of the upper, lower and vertical conveyor drive lines.

Figure 38 is a section taken on line 38—38 of Figure 37.

Figure 39 is a detail section of the upper conveyor actuating mechanism.

Figures 40 and 41 are sections taken on lines 40—40 and 41—41 respectively of Figure 37.

Figure 42 is an isometric view of the locking device, with spring removed, for controlling the oscillatory motion of the vertical conveyor elevating rods.

Figure 43 is a view in elevation, partly in section of pitman and crank connecting the conveyor drive line to upper conveyor actuating mechanisms.

Figure 44 is a fragmentary isometric view exploded of details of locking device and crank to control oscillatory motion of vertical conveyor elevating rods in which the locking sleeve is shown removed from the rod on which it is normally positioned.

Figure 45 is a view in elevation, partly in section of the screw jack for elevating the loading tray.

Figure 46 is an elevation, partly in section, taken on line 46—46 of Figure 45.

Figure 47 is a transverse section on line 47—47 of Figure 46.

Figure 48 is a top plan view of selective loading magazine showing ramming device for pushing rockets into gun belt.

Figures 49, 50 and 51 are detail views of the rocket ram mechanism, Figure 50 being a section taken on line 50—50 of Figure 49.

Figure 52 is a sectional detail view of the power drive and reduction gearing for the "dud eject" mechanism.

Figures 53, 54 and 55 are further details of "dud eject" ram mechanism.

Figure 56 is a schematic diagram with appropriate legends of the control box switch panel including the gunner control station, and the magazine control box.

Figure 57 is a schematic diagram of the load cycle circuit.

Figure 58 is a schematic diagram of the magazine cycling circuits, and rocket position indicator circuits.

Figure 59 is a schematic diagram of the electrical circuit to remove a dud round, the forward cycle gun belt electrical circuit, and the reverse cycle gun belt electrical circuit.

Figure 60 is a schematic diagram of the firing circuits.

Referring in detail to the drawing, numeral 1 identifies a light or medium tank having a circular opening 2 in its top or roof 3. This opening is reinforced by a circular raceway 4 of an antifriction bearing 5. The inner or rotatable raceway 6 of bearing 5 supports the launcher as a whole for training about a normally vertical axis 7 (Figs. 1, 48 and 59), including a well 8 which, as shown generally upon Figure 1, provides a support for the gunner and parts of the belt-loading mechanism 9. The turret 10 is also rigidly secured to raceway 6 and, as best shown upon Figures 1 to 4, is shaped to provide a trough 10a within which the launcher tube or barrel 11 may be depressed a few degrees below horizontal or point blank position. Conventional power means, not shown, under control of the gunner, are provided to rotate the entire turret in train about the axis defined by bearing 5.

The turret at its rearward portion as disposed in Figure 1, is formed to provide trunnion bearings 12 and 13. As best shown at Figures 2, 4 and 6, the breech portion 14 of the launcher is generally cylindrical and has aligned trunnions 15 and 16 at its end journaled in the respective bearings 12 and 13 whereby the launcher tube is mounted for elevation. Movement of the launcher tube in elevation is effected by a reduction power drive shown in detail in Figure 5. This drive is a unitary item mounted upon a frame or casing 17 fixed to a part 10d of the turret. The drive will be obvious from inspection of the figure so that it is deemed sufficient to identify reversible motor 18 having pinion 19 fixed to its shaft 20, gear 21 in mesh with pinion 19 and fixed to shaft 22 having a worm 23 thereon. From worm 23 the drive proceeds to gear 24 on shaft 25, pinion 26 on the same shaft and in mesh with gear 27 which in turn meshes with a gear segment 28 cut into the external peripheral surface of breech 14 or, alternatively rigidly attached thereto concentric of the axis 29 of trunnions 15 and 16. The operation whereby energization of motor 18 for rotation in one direction or the other changes the elevation of the launcher tube, will be obvious.

Preparatory to describing in detail the various parts of the gun mechanism cooperating to load, launch and fire a plurality of rockets, reference is made to Figure 7 and Figures 8a to 8f for a general description and operation of the gun. As can best be seen in Figure 7, launching tube 11 is provided with a hole 30 a short distance rearwardly of the muzzle end of the barrel. A right angled bell crank member 31, pivotable about a pin 32, fixed to the gun frame, is provided with a downwardly extending muzzle trip lever portion 33 protruding through hole 30 a short distance into the barrel 11, to be engaged by a fired rocket which is traveling up the launcher tube. A link 34 has one end pivotally secured to the free end of bell crank member 31, and the other end to one end of a second right angled bell crank member 35 rotatable about a fixed pivot 36. The free end of bell crank 35 is pivotally secured to a link 37, to the other end of which is pivotally secured a third bell crank member 38 rotatable about a fixed pivot 39, and in turn pivotally secured to a forwardly and rearwardly reciprocable clutch operating rod 40, which lies below and is parallel to launching tube 11.

The power for driving a continuous belt mechanism for feeding rockets automatically into the launcher tube is obtained from a blast operated turbine. A turbine wheel 41 is located within the launcher tube 11 adjacent the breech end of the tube to intercept a portion of the exhaust gases as they proceed rearwardly to be exhausted to atmosphere. Turbine wheel 41 is fixed to turbine shaft 42 which is in turn journaled in a speed reduction gear box A, from which there extends a shaft 43 upon which is mounted a driving clutch plate 44 rotatable therewith. A driven clutch member 45 which is movable into and out of engagement with plate 44 is mounted upon a shaft 46 extending forwardly of and in horizontal alinement with shaft 43. The driven clutch member 45 comprises a sleeve 47 splined to shaft 46, upon one end of which is coaxially mounted a flat disc 48 for engaging plate 44. On the other end of sleeve 47 is fixed a boss or ring 49 embraced between the forked end of a link 50 pivotable about a fixed pivot 51, the other end of link 50 being secured to a collar 52 concentric with clutch operating rod 40 and fixed thereto to be movable therewith. A stop member 53 is secured to the rearward end of clutch operating rod 40 and a compression spring 54 encircles rod 40 between collar 52 and stop 53 to maintain pressure on clutch plate 48 when it is in engagement with plate 44 due to the movement of rod 40 to the left by the action of a fired rocket on muzzle trip lever 33.

Shaft 46 upon which is mounted the driven clutch member is journaled in a second speed reducing gear box B from which there extends a shaft 55 journaled in a third gear box C, in which is located later to be described mechanism for actuating the belt drive sprocket shaft 56. Shaft 55 has mounted thereon a pair of axially spaced pawl cams 57 and 58 for actuating rods 59 and 60, to the upper ends of which are secured "hold in pawls" 61 and 62 which in turn engage stops 63 and 64 mounted on clutch operating rod 40 and movable therewith to various positions of operation in response to the action of a rocket upon muzzle trip lever 33 (see Figs. 7, 14 and 15). Also mounted upon shaft 55 is a third cam 65 for actuating a firing sequence switch 65a. A compression spring 66 encircling rod 40 is biased to move rod 40 to the right, when freed to do so by the action of the "hold in pawls."

Means are also provided to eject a dud from the mechanism. The clear dud motor 73 serves two functions as a source of power. It may be "clutched in" to shaft 69 in order to index the rocket belt one position either forward or in reverse; or it may be "clutched in" to a mechanism to be described later which is not shown in the Fig. 7 but is shown in Fig. 52 in order to eject a dud. When the clutch shift handle 387 Fig. 56 is in the manual cycle position the rocket belt may be indexed either forward or in reverse by either manual control or by motor 73. Clutch plates 70 and 71, Fig. 7, are engaged and gear 347 is disengaged from gear 348 Figure 52 for this condition. When the clutch shift handle 387 Fig. 56 is in auto cycle and dud eject position the clutch plate 70 is engaged with brake plate 70A Fig. 7 and gear 374 is engaged with gear 348 Fig. 52. This allows for cyclic operation of the rocket belt by the turbine power, and for the dud eject cycles by either manually or by power from motor 73 Fig. 52.

In the general operation of the gun according to the schematic diagram of Fig. 7, after the rocket belt has been loaded with twenty rockets as in the fully armed position with the first rocket in place so as to be alined with the launching tube, the trigger firing switch is closed to fire the first rocket. The gas blast from the rocket impinges against the turbine wheel 41 thereby energizing the blast turbine. As the rocket passes through the firing tube it deflects the muzzle trip lever 30 which in turn moves the rod 40 to the left to engage the "hold in pawls." The movement of the rod also engages the driven clutch plate 48 with the driving clutch disc 44 to advance the rocket belt by virtue of the movement of the belt drive shaft and sprocket through the various gear trains. If the control trigger is released after one round is fired, the cam operated hold-in-pawls 61 and 62 are positioned so that the clutch is returned to the stopped or braked position. If the control trigger is kept depressed for a volley, the "hold in pawls" due to the action of the rockets on the muzzle trip lever, will continue to hold the clutch engaged through the cycle. The clutch is therefore held in engaged position during a volley of shots.

Referring to Figures 8a to 8f and to Figures 14 and 15 the action of the "hold in pawls" in connection with the fire sequence control system for one complete cycle will now be explained. Figure 8a represents the position of pawls, rods and other essential elements when the gun is at rest and ready to be fired. After the control trigger (not shown) is pressed and the rocket in the firing tube has depressed the muzzle trip lever, the conditions in Figure 8b now obtain. In this position rod 40 has been displaced to the left and pawl 61 is now free to slide upwardly, urged by spring 61a to engage the back side of stop 63 thereby locking rod 40 against moving back to the right. The clutch plates 48 and 44 are now in engagement, and since the blast turbine has been energized by the rocket exhaust gases, the belt feed mechanism starts to move. Spring 54 (Fig. 7) maintains pressure on the clutch plates and the rotation of shaft 55 turns the "hold in pawl" cams to the position seen in Figure 8c. Cam 58 has now turned sufficiently to permit pawl 62 to slide upwardly under pressure of spring 62a and to take a position about 1/16" to the rear of stop 64, however cam 57 has not rotated sufficiently to withdraw pawl 61 from engagement with stop 63, therefore the clutch remains engaged. Also, cam 65 has turned sufficiently to open firing sequence control switch 65a. Further rotation of shaft 55 brings the cams to the position seen in 8d. Here cam 57 has turned sufficiently to withdraw pawl 61 from engagement with stop 63 whereupon spring 66 forces rod 40 to the right about 1/16" until stop 64 engages pawl 62. However this slight movement is insufficient to disengage the clutch plates 44 and 48 since the pressure on the clutch by spring 54 is not materially affected. Figure 8e represents the position of elements where the motion has progressed to a point such that firing sequence control switch 65a has been closed by cam 65, while the "hold in pawls" and cams still maintain rod 40 in locked position so that the clutch remains engaged. If the control trigger switch (not shown) is now pressed the second round will be fired, and the moving parts will assume the position shown in Figure 8f wherein the second round has depressed the muzzle trip lever and the cams have been rotated so that rod 40 is free to move to the left to allow pawl 61 to engage stop 63. From this point the cycle starting with the position of parts in Figure 8b is repeated. It is to be noted that if the control trigger is not pressed after the position in 8e is reached, the second rocket will not fire, the muzzle trip lever will not actuate rod 40 and the cycle will stop when the position illustrated in Figure 8a is reached.

The details of the blast operated turbine, reduction gearing, clutch and other associated parts will now be described with particular reference to Figures 9-12. A housing 74 for receiving the parts of the blast operated turbine is secured to the rear peripheral surface of cylindrical breech portion 14 at a location opposed to and in approximate horizontal alinement with launching tube 11 when in point blank position (see Figs. 4, 9 and 11). Within housing 74 is received a cylindrical tubular extension 75 which projects forwardly and into breech portion 14 through a hole in the wall of the breech and provided for that purpose. Tube 75 is always in axial alinement with launching tube 11 and with that one of the blast tubes forming a part of the belt feed, which is at the moment of firing, in axial alinement with the launching tube 11 (see Fig. 4). Tube 75 is provided with a vertical baffle plate 76 which extends across the middle portion only of tube 75 to divide the tube into two exhaust passages 77 and 78 (Fig. 9) each of which connects with rearwardly and upwardly curved exhaust conduits 79 and 80. A scroll or shield 81 having an enlarged downwardly tapering open bottom or mouth 82 is horizontally interposed into complementary openings in the walls of conduits 79 and 80, whereby the turbine rotor is positioned in the path of the exhaust gases, extending across a major portion of each conduit 79 and 80 to intercept a portion of the exhaust gases. Housed within scroll 81 is a horizontal turbine wheel 41 fixed to a turbine shaft 42 received in a vertical elongated bore 83 in frame 74. When a rocket is fired, the exhaust gases are expelled rearwardly out of the blast tube into tubular extension 75 and into exhaust conduits 79 and 80 to impinge against the blades of turbine wheel 41 to thereby rotate it and shaft 42 at an extremely rapid rate. Suitable roller bearings 84 are spaced along the length of shaft 42 to provide support and appropriate anti-friction rotation thereto. Means (not shown) are also provided to supply a suitable lubricant to the bearings, gears and other rotating parts.

First reduction gear box A (Fig. 11) is located directly below the lower end of shaft 42. Received in this gear box is a bevel pinion 85 meshing with a bevel gear 86 fixed upon a shaft 43 to rotate therewith. Suitable roller bearings 88 surround shaft 43 to provide for anti-friction rotation. Referring to Figure 12, shaft 43 is journaled in and extends into a clutch housing 87.

Members 44, 44a and 47 form a double clutch unit. The clutch member 44 contains both driving plates and driven plates. The driven plates in clutch 44 are connected permanently with the driving plates of 47 and with gear 88 through shaft 46. The clutch actuating collar 44a positioned by rod 40 engages driving and driven plates of 44 in one condition to connect the shaft 43 to shaft 46 allowing turbine to drive the belt cycling mechanism. The collar 44a positioned by rod 40 engages driving and driven plates of 47 in the other condition to connect shaft 46 with gear 67 allowing shaft 46 to be braked to a rapid stop through gear 68 shaft 69 and to the engaged rotating and stationary fixed plates of 70. Also in this condition driving and driven plates of 44 are disengaged to allow for the free wheeling of the turbine, gearing, and shafting of the gear train to shaft 43 and driving plate of 44. At no time is the turbine braked to a sudden stop.

The double clutch unit 72, 71, and 70 is a similar unit except it is smaller in size. This clutch is manually operated by the control on the gunner control box called "clutch shift" handle. The member 72 contains driving and driven plates which are disengaged when clutch shift handle is in auto cycle and dud eject position. In this condition the rotating plates of member 70 are engaged with the stationary plates of 70. The stationary plates are permanently fixed to the gear box housing by a key so that they will not rotate. This forms the "anchor" for the rapid braking to rest of gear train following shaft 46.

When the clutch shift handle is in the manual cycle position the collar 71 is moved toward member 72 which engages the driving and driven plates of member 72 and disengages the rotating and stationary plates of member 70. The driving plates of 72 are connected permanently to the rotating plates of 70 and to shaft 69. Therefore, rotation of shaft 72a by motor 73 or by manual power will drive shaft 69, gear 67, shaft 46, and so on down the gear train to effect a rocket belt cycle either in the forward or reverse direction.

Clutch plate 48, Fig. 7, represents schematically the permanently connected driven plates of 44, Fig. 12, and driving plates of 47, Fig. 12, the clutch actuating collar 49, Fig. 7, represents the clutch actuating collar 44a, Fig. 12.

Clutch plate 70, Fig. 7, represents schematically the permanently connected driving plates of 72, Fig. 12, and the rotating plates of 70, Fig. 12, the clutch actuating collar which is normally operated by the clutch shift handle 387, Fig. 56, is not shown in Fig. 7, but is shown as part 71, Fig. 12.

A second speed reduction gear box B is secured to the forward wall of clutch housing 87, and received within this gear box is pinion 88, concentrically mounted upon shaft 46, meshing with a gear 89 fixed to one end of short shaft 90, and on the other end of short shaft 90 is mounted a pinion 91 which in turn meshes with a gear 92 mounted upon one end of a short shaft 93 as plainly seen in Figure 12. To the other end of shaft 93 is secured a bevel pinion 94 meshing with a bevel gear 95 fixed to rotate shaft 96 which extends into gear box C. As can plainly be seen in Figure 13 gear box C contains the gearing and mechanism for driving the belt drive sprocket shaft 56 and shaft 55 upon which are mounted the "hold in pawl" cams 57 and 58. A pair of opposed axially spaced bevel pinions 97 and 98 are secured to shaft 96 to rotate therewith. Bevel pinion 97 meshes with a bevel gear 99 secured to shaft 55 while beveled gear 98 meshes with a beveled gear 98' secured on shaft 56. Upon shaft 55 are mounted the hereinabove described "hold in pawl" cams 57 and 58, and a cam arrangement 100 for oscillating a torque tube 101 concentric with and journaled by ball bearings 56a and 56b, link belt drive shaft 56 to provide the intermittent feeding action of the gun belt, as subsequently to be described. It is important to note that the housing 96a in which shafts 96 and 55 are journaled, is not fixed to torque tube 101, but is journaled thereon by antifriction bearings 96b and 96c. Housing 96a is fixed to the frame or box C, while, for a purpose later described, tube 101 can oscillate relatively to the box about the axis defined by bearing 96b and 96c.

Referring again to Figure 13, wherein the rocket belt drive on one end only of the drive shaft is shown, the belt drive is seen as a sprocket 105 mounted on a driven eccentric 102 through a cam controlled planetary gear mechanism generally identified at 106, 108, which produces a motion so that the upper pass of the belt moves with an intermittent motion and dwell while the lower pass of the belt moves at nearly constant velocity. The various elements of the belt drive comprise an eccentric 102 keyed to shaft 56 in the well known manner. About the eccentric is concentrically disposed a support member 104 journaled upon the eccentric by antifriction bearings 102a and 102b for the drive sprocket 105 and an internal gear 106. The lower end of shaft 56, as viewed in Figure 13, is journaled in an antifriction bearing 107 to provide for frictionless rotation. Also concentrically disposed about shaft 56, and journaled thereon by bearing 109 axially inwardly of eccentric 102, is an external gear 108 which is rotatable relative to shaft 56 and which is adapted to mesh with internal gear 106 and fixed to torque tube 101 for a purpose subsequently described. The axis $R_1$ which is the axis of drive shaft 56 is also the axis about which the eccentric 102 rotates, however the internal gear 106 and sprocket 105 rotate about the eccentric whose axis of generation is $R_2$, and are also rotated with respect thereto so that the sprocket center travels about a radius which is represented by distance $R_1$—$R_2$. It is obvious that as the eccentric rotates, the internal gear 106 meshing with the external gear 108 will rotate the sprocket, the ratio of gear teeth of the two meshing gears being so selected that each revolution of the shaft 56 and eccentric will produce commensurately a fraction of a revolution of the sprocket so that the belt is advanced in position the distance equivalent to one round. In the hereinabove description, if the external gear 108 were to remain stationary the belt would advance each round at a constant angular velocity equal to the angle subtended on gear 106 by a number of teeth equal to the difference between the teeth on gear 106 and gear 108 for each rotation of shaft 56. In order to provide for the necessary "dwell" for each rocket when in firing position means are provided to oscillate the external gear in successive clockwise and counterclockwise movements about shaft 56 and in timed synchronism with the revolution of the shaft. These means comprise torque tube 101 which is concentrically disposed about shaft 56 and to which is secured a bracket 110 formed as an arcuate segmental portion 111 secured in any convenient manner to tube 101 and having two legs 112 and 113 integral with portion 111 and extending radially outwardly. As seen in Figures 13, 13a and 13b, legs 112 and 113 are axially spaced along the surface of the torque tube, each of said legs being equally angularly disposed relative to a horizontal axis drawn through the center of shaft 56 (see Figure 13a) so that leg 112 lies below and leg 113 above this axis. The extreme ends of each leg are formed as a portion of a circle merging with convergent sides and to the inner faces of each leg adjacent the curved ends are secured rollers 114 and 115 which are acted upon by cams 116 and 117 fixed upon shaft 55. Cam 116 is arranged so that its peripheral surface engages roller 114 whereas the peripheral surface of cam 117 engages roller 115. Thus as shaft 55 rotates torque tube 101 describes a timed oscillatory motion whose angular extent is a function of the shape of the cams and the distance of roller 114 and 115 radially of shaft 56. Torque tube 101 is keyed into external gear 108, as at 101a so that the motion of the torque tube is transmitted to the external gear in a manner to cause the rocket belt to "dwell" at the firing position as previously mentioned. It should be noted that shafts 55 and 56 rotate at the same angular speed by reason of the same pitch diameter ratios between gears 99 and 97 as between gears 98 and 100.

In order to further reduce the power and to avoid peak loads in the belt, the idler sprocket is movable from an extreme outward position, horizontally inwardly toward the drive sprocket during periods of decelleration to reduce the distance between the centers of the drive sprocket shaft and the idler sprocket shaft. This movement loads a spring associated with the idler, and upon acceleration the spring is unloaded. The spring loaded idler also maintains constant tension in the belt under variations of temperature and load.

This action generally may be described as energy balance or conservation system for controlling the power requirements, wherein excess energy is first stored by the before-mentioned spring upon deceleration of the upper portion of the feed belt, and then released during acceleration of the feed belt system. The mechanism for this energy balance system is more fully described as follows:

Referring to Figures 9, 16, and 17, the sprocket drive system, described previously and illustrated in Figs. 13 and 17, produces motion of the lower half of the feed belt while the upper portion of the belt dwells. The unequal motions of the two portions of the belt effect a shift of the entire feed belt toward the drive end. The idler sprocket "G" is movably mounted to follow this belt shift. The idler is spring-loaded in a direction away from the drive sprocket. One of the idler sprockets is rotatably mounted on an arm "C," which extends from and is affixed to a rod "A," which acts as a torsion bar spring and is the axle, or shaft, which attaches to the fixed structure of the launcher. The other idler sprocket is mounted opposite the first, but in a similar manner on arm "D" which is attached to torsion bar "B." The torsion bars are so mounted that they "wind up" as the feed belt shifts toward the driving end and unwind during acceleration of the upper portion of the belt as it shifts away from the driving end.

A tension adjusting device "F" which is simply a spiral gear driven worm and sector, is mounted near the end of each torsion bar spring. The devices are interconnected through a long shaft and spiral gear system such that both springs can be wound or adjusted simultaneously from one point. Since one sprocket is suspended from above the center line and one from below, a very slight, insignificant skewing of the sprocket axis occurs at the extremes of the travel.

The tension adjusting devices permit unloading of the springs for manual operation of the launcher.

Details of the rocket belt and rocket belt tubes may be seen on Figures 17, 18–25. The rocket belt is located in the cylindrical breech portion 14 of the launcher, and its motion is generally transverse of the longitudinal axis of the launcher tube, with the upper portion of the belt elevated to a location so that when the launcher is ready to be fired, one of the tubes is always in axial alinement with the launcher tube. Since the launcher tube and cylindrical breech portion are fixed relative to one another, and unitarily movable in train and elevation, this alinement of the launcher tube and of the firing position of the gun belt, will always obtain. The belt is made up of a plurality of elongated cylinders or tubes 118 (one shown Fig. 19) provided with built up rectangular steel frame sections 119, about the fore and rear ends of the tubes, having overlapping and mating bosses 120 and 121 which are longitudinally apertured to receive linking pins 122 (see Fig. 18). The rockets are rammed into the fore end of the belt tubes from a storage magazine and conveyor to be described, and the cylinders are provided with stops 123 in the aft end as seen in Figure 20 to bear against the rear end of and to position the rocket in the aft direction. Resilient stops 124 are also provided in the cylinders to retain the rocket in the forward direction, four of these stops being arranged in diametrically opposed pairs to bear against the ogival surface of the rocket. The stops are positioned in rectangular radial extensions 125 of the cylinder tube, and as seen in Figures 21, 25, 25a and 25b, each comprises a torsion spring 126, wrapped about a stud 127 secured in the side walls of extensions 125, and having a first leg 128 bearing against the rear wall of the extension and a forward leg 129 abutting a downwardly depending sear 130 pivotable about a pin 131 parallel to and forwardly of shaft 127. A rearwardly extending Y-shaped detent 132 is pivotable about a shaft 133 located forwardly in radial extension 125 and extending between the side walls thereof and the detent is biased inwardly by a torsion spring 134 having one leg bearing against the roof of extension 125 and another leg abutting the top surface of the detent. When the rocket is at rest in the cylinder tube, one leg of the Y detent bears against the ogive of the rocket R and the other leg abuts a curved cam surface on sear 130 to retain the rocket against inadvertent forward displacement (Figs. 25). Figure 25a illustrates the position of the stop elements as the rocket is moving forward in the tube and Figure 25b delineates the elements after the rocket leaves the tube. A stop 135 is also provided to limit the inward movement of Y detent 132 in this last position. Since the operation of the stop elements is obvious from examination of the drawings it will not be further described. Each rocket tube is additionally provided (see Fig. 24) with a spring biased lever 136 in a housing 136a fixed to the rear end of the tube 118 and which extends into the tube to be displaced outwardly when so urged against the bias of the spring 136b upon engagement by the peripheral surface of a rocket, to make contact with the conventional contact ring on each rocket. As shown each lever 136 has a projection 136c extending through a slot 118a in its tube 118 and is pivoted upon a transverse shaft 136d about which the coil portion of spring 136b extends. Contact 136c is electrically insulated from the lever as indicated at 136e, Figure 24. Current for firing the rocket may be led thereto by a lead 136f, as subsequently explained. The tube is also provided with a second spring-biased lever 138 located midway between the forward and rear ends of each tube and which is displaced outwardly to close firing contacts 139 in a circuit to turn on an indicator light in a panel (not shown) see Figure 23. By means of levers 138 and switches 139 the operator is given a continual visual indication of the loaded condition of each tube in the feed belt, whereas the firing contacts are connected in the firing circuit and to the trigger to enable the operator to fire each rocket as its tube moves into firing position in alinement with the launcher tube 11.

The general arrangement of the belt loader 9 for storing the rockets within the combat vehicle and for loading them into the belt feed mechanism is illustrated generally in Figures 4, 26, 27 and 48. This structure is received and supported for the most part in well 8 and consists of a rocket magazine 140, a lower horizontal conveyor 141 directly beneath the rocket magazine, a vertical conveyor 142 to the right of the rocket magazine as seen in Figure 26, an upper combined elevating tray and horizontal conveyor 143 directly above the rocket magazine, and a ram mechanism 145 located directly above the upper conveyor and elevating tray to ram the rockets into the gun belt. Suitable structural members, not important to the invention, are provided for supporting the feed and storage mechanism within well 8 and for supporting the various driving assemblies for actuating the upper and lower horizontal conveyors, the vertical conveyors, and the ram mechanism. The rocket magazine is generally hexahedronal in shape to receive a plurality of clips 146 of a length and width to accommodate a rocket in horizontal position, and of a depth to accommodate a plurality of rockets in vertical alinement. In the illustration shown each clip contains 7 rockets. The magazine is provided with spaced horizontal rails 147 generally perpendicular to the longitudinal axis of the launcher tube in point blank position, and the upper end of each clip, coextensive with its width, is turned outwardly 90° to form a support to which is secured in any convenient manner, a race or housing 148 in which are embedded balls 149 (see Figs. 27 and 28). The magazine is provided with a plurality of vertical straps 149a secured in any convenient manner to the support structure and to the outer rail surface. The straps are horizontally spaced along each rail a distance approximately equal to the width of a rocket clip, and are utilized as support members for the ram mechanism in a manner later to be described. The straps 149a also extend downwardly to a depth approximately one-third the depth of the magazine and lower conveyor structure, to provide supports for the drive shaft and motor of the ram mechanism.

To load the magazine, the rockets clips are placed into the first compartment on the left of the magazine (as seen in Fig. 26), formed by straps 149a. This compartment will be designated position 10 and remaining compartments will be consecutively numbered in descending order to position 1 on the extreme right. Since the upper conveyor elements would normally provide obstruction for loading the clips into the magazine, the upper conveyor in the number 10 position is provided with a removable section 150 (see Figs. 26 and 30). Starting with position 10 the first clip is placed so that the balls 149 are in engagement with the upper surface of rails 147, then the clip is pushed to the extreme right to the number 1 position. The remaining clips are inserted in like manner until the entire magazine is loaded. Figure 26 is shown with nine clips, each containing 7 vertically alined rockets, in place. Each clip 146 is bottomless except for two swingable right angled retainer members or gates 151 located so as to support a rocket at its rear end, and at the point where the ogive merges with the cylindrical bourrelet (see Figs. 27, 28 and 29). Each gate or latch is formed as a cut out portion 152 of the left side wall of a rocket clip, with a right angled leg 153 spanning the bottom of the clip to the other side. The gate is pivoted as at 154 to swing outwardly by the weight of a rocket, and is prevented from pivoting by an elongated retainer pin 155 which extends through holes 156 in the gate and horizontally alined holes 157 in the side wall of the clip. After the magazine is fully loaded the pin in the left clip is first removed to load the lower conveyor. In fully loaded condition, in the embodiment illustrated, the magazine will hold 63 rounds, seventeen rounds are carried in the conveyor feed system, and twenty rounds in the gun belt. When the launcher is fully loaded, the pins are withdrawn from each of the remaining rocket clips, and as the lower conveyor feeds to the right into the vertical conveyor, each clip is successively emptied, the retainer members or gates 151 securing each vertical row of rockets in its respective clip until the clip to the left has been emptied. Each rocket clip is provided with a slot 158 in the wall directly opposite to the retainer member to provide a space to accommodate the pivotable gate from the next clip to the right. In this manner, the rockets in a clip are retained therein by the lowermost rocket in the clip immediately to the left, as seen in Figure 26.

The lower conveyor 141 is disposed directly beneath the lower end of the rocket clips in place in the magazine, and in general arrangement a set of stationary spacers or dogs, are used to position the rockets when they are at rest, and a set of traveling spacers are used to hold the rockets and to move each rocket toward the right, in Figure 26, to the next position. As illustrated in Figures 31–36 with particular reference to Figure 33, the lower conveyor is made of built up steel construction, and comprises a lower fixed horizontal frame member 159 to which are secured in any convenient manner or made integral therewith, vertical laterally spaced members 160, 161, and 162, members 161 and 162 defining therebetween an elongated space 163. A fourth heavier vertical member 164 is also secured to frame member 159 and is disposed in abutting relation to vertical member 162 on the vertical face of that member opposed to the face defining one side of space 163. The moving elements for actuating the traveling spacers are for the most part located in space 163 and comprise an elongated member 165 having its near vertical face in sliding contact with the inner face of vertical member 161 and its opposed face in sliding contact with member 162, and having an elongated C-shaped recess 166 formed therein. A reversed C-shaped member 167 is keyed into member 165 and has its remote vertical face in sliding contact with the inner face of vertical member 162, and member 162 is provided with an elongated slot 168 of the same height and in horizontal alinement with recess 166. C-shaped member 167 is also provided with an elongated slot 169 of less height than recess 166, the arrangement of the recess 166, slot 168 and slot 169 being such as to accommodate an H-shaped cam bar 170 laterally spaced from the rear vertical wall of recess 166 and having one leg 171 received in the remaining portion of recess 166, a second leg 172 forming part of but not integral with the remaining section of the H-bar received in slot 168, and a middle horizontal part 173 integral with leg 171 and fitting into slot 169. At equally spaced intervals along the length of the conveyor, and at a distance substantially equivalent to the spacing between rounds, there are formed in member 165 a first set of vertical hexahedronal recesses 174 into which are received vertically reciprocable spacer blocks 175, which are, in the nearest face thereof, provided with Z-shaped grooves or slots 177 as clearly seen in Figure 34, and each said groove is formed with a lower rearwardly and upwardly inclined face 178 ending in a short horizontal face 179, and an upper horizontal longer face 180 ending in a rearwardly and upwardly inclined face 181. Each block 175 is movable vertically by virtue of a Z-shaped cam member 182 cooperating with groove 177 in a manner later to be described. Cam member 182 as seen in Figure 33 comprises a rearwardly extending horizontal leg 183, an upwardly and rearwardly inclined leg 184 and an upper horizontal leg 185. Each cam 182 is embossed upon the rear face of leg 171 of the cam bar and lies in recess 166 in position rearwardly of its corresponding spacer block, so that the horizontal movement of cam bar 170 forces cam 182 into slot 177 to raise the spacer. As the cam is withdrawn the spacer block drops by gravity into its vertical slot. Conveyor member 164 is provided with a plurality of vertical hexahedronal recesses 186 in which are received vertically reciprocable space blocks 187 in alinement with blocks 175 and provided with Z-shaped slots 188 similar to slots 177 in blocks 175 but opposed in direction of inclination (see Figs. 31 and 32). Conveyor member 164 is also provided with a horizontally elongated recess 189 of a depth equal to the height of cam bar 172 and forming with cam bar 172 a space to accommodate a plurality of Z-shaped cams 190 opposite in direction to cams 182, embossed upon the rear surface of cam bar 172 and adapted to be received in slots 188 to force upwardly, spacer blocks 187. Referring again to Figures 31 and 32 the actuation of the cam bars will now be described. Members 165, 167 and integral members 171, and 173 of cam bar 170 are all horizontally reciprocable and movable as a unit. Additionally cam bar 172 is further movable horizontally after the travel of members 165 and 167 has ceased, to force cam bar 182 into slot 177 of spacer block 175 in order to provide vertical reciprocable movement for the spacer blocks. This horizontal travel or movement is effected as follows. Member 165 is integral with an actuator rod 191 which is permitted free movement within a slot 192 in the lower flange of frame member 159. Actuator rod 191 is in turn pivotally connected to a conveyor drive rod 193 which has an eccentric connection 193a with drive shaft 194 driven by the conveyor drive motor 195 (see also Fig. 37). When the motor is energized shaft 194 is caused to rotate to move rod 193 and the moving parts of the conveyor in horizontal reciprocable timed motion to feed the rockets to the right toward the vertical conveyor. Member 165 is provided with a recess 196 in its near vertical face for receiving a flat disc-shaped member 197 from which there protrudes in a direction laterally outwardly a pin 198. Pin 198 is received in a horizontal slot 199 in the web of vertical member 161 (see Fig. 31) which is made long enough so that the travel of pin 198 is approximately the same as the distance between rounds as they are located in the gun belt. A shaft 200 is securely fixed to and extends through the center of disc 197 in a lateral direction inwardly and opposed to pin 198, and is fixedly received in an aperture 201 formed in the lower section of an upwardly tapering crank member 202 which is provided with upper and lower curved surfaces and which is pivotable in clockwise and counterclockwise direction within a recess 203 formed in the remote vertical face of member 165, substantially vertically coextensive with recess 166. Bell crank member 202 is provided with a pin 204 secured to the upper end thereof and extending laterally inwardly to be received in a vertically elongated slot 205 formed in cam bar 171 (see Fig. 35). A pin 206 protrudes from the remote face of cam bar leg 171 adjacent its upper end and extends into an elongated slot 207 formed in cam bar 172, said slot having a length approximately equal to the length of slot 199 in vertical member 161 (see Fig. 36). As previously indicated, spacer blocks 175 are traveling spacers which also move vertically whereas spacers 187 are free to move only in a vertical direction within member 164. The sequence of operation is as follows. At the beginning of a firing cycle, fixed spacer blocks 187 are retracted, movable spacers blocks 175 are projected, pin 198 is in the left end of slot 199 and pin 206 is in the left end of slot 207. The moving members 165, 167 and 171, 173 are in the left-most position, so that leg 185 of cam 182 abuts face 180 to retain block 175 in projected position whereas cam 190 is withdrawn from groove 188 so that block 187 is retracted. When the conveyor motor is energized actuator bar 191 is moved to the right and at the proper point in the travel, pin 198 strikes the right end of slot 199 and the crank member 202 moves clockwise to move cam bar 171 to the right to force cam member 185 into and through spacer block groove 177 to retract spacer block 175. At the same time pin 206 has engaged the right end of slot 207 to force cam bar 172 and cam 190 to the right to project spacer block 187 upwardly in like manner. In the second half of the cycle the traveling spacers move to the left to regain their original position while the fixed spacers are moved downward in the same action. Thus the movement through one cycle will advance the rockets one position while the fixed spacers securely hold the rockets in place during the time the traveling spacers return to the original position.

The vertical conveyor, disposed in a lateral direction just forwardly of the No. 1 position of the rocket in the storage magazine (see Fig. 26), carries the rockets from the lower to the upper conveyor. Two lateral spaced elevating rods 208 are provided to advance each rocket to the next position, and since the mechanism and means to drive each rod are essentially similar, only one of the devices will be described. Referring generally to Figures 37-44, and in particular to Figure 37, elevating rod 208 is a solid vertically elongated cylindrical shaft which is horizontally oscillatable through 90° within guide bushings 209 secured in any convenient manner to the conveyor frame structure. Having secured thereto or made integral therewith there are provided a plurality of fingers 210 vertically spaced along the shaft. Each of the fingers 210 has the general shape of an isosceles triangle with its base position secured to elevating rod 208 and with sides formed as inwardly curved segmental arcs to abut the surface of rockets to be lifted to the next position while the rod is in the process of being raised. The mechanism for actuating the elevating rods comprises electrical motor 195 which provides the driving force for both the lower and upper conveyors, and suitable reduction gearing (not shown) for driving a main motor shaft 211 to which is secured a crank 212 rotatable therewith. A second shaft 194 is eccentrically fixed to crank 212 and concentric with shaft 194 are coaxially alined sleeves 213 and 214 which loosely encircle the shaft so that they are each pivotable relative to the rotation of the shaft. Suitable means are secured to the extreme end of shaft 194 to prevent sleeves 213 and 214 from slipping off the shaft. To sleeve 214 is secured a radial extension or crank 193a which provides the driving connection to the lower conveyor drive rod and actuator bar as previously described. A hollow elongated sleeve 216 integral with sleeve 213 extends radially upwardly (see Figs. 37 and 44) to provide a bushing in which is mounted for sliding pivotal movement the lower end of elevating rod 208. Universal joint 208a connecting the lower and upper sections of rod 208 enables the lower end rod 208 to pivot as shaft 211 rotates.

Hollow sleeve bushing 216 is provided with a window or cut out portion 218 which is an arcuate slot of substantial width axially, having a lower curved surface, and which is located on that side of the sleeve abutting the vertical right face of crank 212 (as seen in Figure 37). A cam 219 (see Fig. 40) integral with elevating rod 208 comprises a pair of fingers 220 extending radially outwardly into slot 218 and having radially inwardly converging inner cam faces 221 disposed at an angle of 90° with respect to one another merging into a curved surface 222. Cam 219 is adapted to be engaged by radially alined inner pin 223 and outer pin 224, mounted on crank 212, as the crank and motor shaft rotate, the timing of the pins being such that the fingers 210 in engagement with the rockets are periodically turned from a position in the plane of the paper as seen in dotted lines in Figure 37 horizontally to a second position perpendicular to the plane of the paper. The fingers pivot to clear the rocket below on the downward stroke, and on the upward stroke are rotated to a position between the rockets to raise each rocket one position to the next level. After the rockets have been elevated one position, they are retained in that position by two sets of dogs 225 vertically spaced on opposed sides of the conveyor (see Fig. 26), and spring biased (not shown) to extend inwardly and upwardly. As the rockets are raised, they engage the dogs and press them outwardly in opposed directions until each rocket assumes its new position, whereupon the springs force the dogs inwardly to engage the under surface of the rocket, and to support each rocket in elevated position until the next upper stroke of the elevator rods.

As seen in Figures 37, 42 and 44 a spring actuated locking device is also provided which is controlled by the action of the pins 223 and 224 as they engage cam 219 to prevent rotation of the fingers except at the proper time. This locking device comprises a yoke 226 loosely fitting about elevating rod 208 secured to hollow sleeve bushing 216 so that the yoke assembly is free to slide vertically within the confines of slot 218. The yoke is also provided with a flat bar 226a integral therewith projecting radially outwardly in slot 218. A flat plate 227, having an upper flat surface 228 and a lower arcuate, curved cam surface 229 to be engaged by pins 223 and 224 is secured to bar 226a, and yoke 226 is provided with a cut-out portion or recess 230 on its under side having a width circumferentially to alternately fit over each of the cam fingers 220 as the elevating rod 208 oscillates. A spring 231 received in a recess in sleeve bushing 216 is urged against the top surface 228 to bias it downwardly into engagement alternately with cam fingers 220 until pins 223 and 224 engage the curved cam surface 229, whereupon the yoke assembly is forced upwardly to release elevating rod 208 for rotation as pins 223 and 224 engage cam fingers 220.

The combined elevating tray and upper horizontal conveyor 143 is located directly above the rocket magazine 140, and the movement of the rockets thereon is in a direction opposed to the movement of rockets in the lower horizontal conveyor 141. As the rockets are moved upwardly in the vertical conveyor, the top-most rocket which is now in the number 1 position is pushed to the number 2 position where fixed and traveling spacers, similar in structure and actuation to the spacer blocks in the lower conveyor, are operated to advance each rocket one position for each corresponding motion of the actuator means, until the first rocket is now in the number 10 position, and the remaining rockets are progressively moved to the left, as seen in Figure 26, to occupy the remaining locations from position 9 to position 1. Since the greater part of the operation, and the details of the lower and upper horizontal conveyors are essentially similar, especially with respect to the fixed spacers, only those details relative to the upper conveyor traveling spacers which are different will be described. Referring to Figure 30 which discloses details of the combined top conveyor and elevating tray, and to Figures 39 and 43 wherein are shown details of the driving mechanism therefor, the traveling portion of the top conveyor is seen as commencing at the right end of the number 2 position and extending toward the left to the number 10 position, which as previously described consists of removable member 150, with its left-most end curved as at 150a to engage the surface of the number 10 rocket when the tray is elevated, to prevent the rocket from rolling off the conveyor. In order to retain the rocket in the number 1 position, horizontally reciprocable means are provided to extend the horizontal conveyor so as to span the vertical conveyor at the number 1 position. This means comprises hook assembly 232 which consists of a horizontally elongated cylindrical member 233, joined by means of a bracket 234 to traveling cam bar 235, and provided with an axial cylindrical bore 236 for receiving a plunger 237 to which is attached an upwardly extending hook or finger 238. A compression and torsion spring 239 is located in bore 236 between the bottom of the bore and the inner end of plunger 237 to bias plunger 237 and hook member 238 to the right and upwardly. The top surface of cylinder 233 is also provided with an arcuate helical slot 240 in which is received an extension pin 241 fixed to the top surface of plunger 237. The timing of the vertical conveyor elevating rods and the actuator bar of the top horizontal conveyor are such that as a rocket is being lifted to the number 1 position, the hook assembly 232 is withdrawn to clear the path of the rocket which is being raised to the upper horizontal conveyor. As the actuator cam bar 235 moves to the right, the top forward edge of hook member 238, which is curved to provide a camming action, engages the under surface of the number 1 rocket, whereupon the hook member is turned from a vertical to a horizontal position by virtue of the action of the helical slot and extension pin. This action enables the hook to pass under the rocket until the rocket is cleared. When the hook and actuator bar have traveled to the extreme right of the number 1 rocket, spring 239 urges the hook member 238 back to its vertical position to engage and move rocket number 1 to the number 2 position as the actuator bar again moves toward the left. The movement from the number 2 to the number 3 position is accomplished by means of a pair of dogs 242 lying side by side (one only shown) and having a pivotal connection 243 with the traveling actuator bar of the upper conveyor. The dogs 242 are constantly urged into a position extending angularly with respect to the top level of the conveyor, and to the left as seen in Figure 30. As a rocket passes over the dogs they are depressed into recesses 244 cut into the top flange of the conveyor structure. Movement of rockets between the number 3 and number 9 position is effected by traveling spacers 245 which operate in the same manner as traveling spacers 175 in the lower conveyor, as previously described. Similarly, fixed spacers 245a are provided in the conveyor to hold the rockets as the traveling spacers are being returned to original position. Additional traveling dogs 246, similar in operation to dogs 242 are also provided to move the rockets from the number 9 to the number 10 position as clearly seen in Figure 30.

The driving mechanism for the upper conveyor will now be described with particular reference to Figures 37, 39 and 43. In Figure 37 a shaft 247 extending to the left of and in horizontal alinement with motor shaft 211, is provided with a driving connection to shaft 211 by virtue of its connection to crank member 212 mounted for eccentric rotation upon shaft 194 which is in turn driven by shaft 211 as previously described. A crank member 248 (see also Fig. 43) has one end secured to shaft 247 for rotation therewith, and its free end pivotally connected with the lower end of a pitman 249 substantially vertically reciprocable in an elongated sleeve 249a secured in any convenient manner to the conveyor frame. The upper end of pitman 249 is formed as a rack 250 (see Fig. 43) to engage the teeth of a pinion gear 251, mounted upon a shaft 252 which is rotatable in timed relation with the driving means for the lower and vertical conveyors, to move the upper conveyor actuator and cam bars. Shaft 252 is a horizontally elongated multiple sectioned tubular member of varying thicknesses extending between upper and lower horizontal frame members 253 and 254 of the conveyor and journaled in horizontally spaced vertical bearings 253a and 254a secured to frame members 253 and 254. Since the upper horizontal conveyor also doubles as an elevating tray for elevating the rockets into position to be rammed into the gun belt, the construction of the conveyor and shaft 252 are arranged so that the structure may be tilted about a pivot point beyond the left end of the conveyor as seen in Figure 39 (one side only shown). This construction comprises bracket means 255 extending outwardly from the left end of the conveyor and having an upwardly turned end 256 apertured as at 257 for receiving a stud shaft 258 journaled in bearings in the conveyor frame (see also Fig. 4). Shaft 252 essentially is constructed in three different sections, the left section 259, a center section 260 of smaller diameter and a right end section 261. Sections 259 and 260 are joined by flexible coupling 262, and section 260 and 261 are joined by flexible coupling 263. Couplings 262 and 263 are necessary to take up torsional and vibrational stresses in the well known manner, additionally coupling 262 also serves as a pivot to permit the center and right ends of shaft 252 to pivot upwardly with the tray relative to section 259 when the rockets are elevated into loading position. The lower frame member 254 is cut out at 264 to provide a clear path for section 259 of the shaft which, of course, is not pivotable. It is to be understood, as plainly seen in Figure 39, that pitman 249 and rack 250, sleeve 259a, and gear 251, as well as the left end section of shaft 252, are not effected and remain stationary as the upper conveyor and tray is elevated.

Horizontally spaced from vertical member 254a are vertical support members 265, 266 and 267 secured to the upper and lower conveyor members and spaced horizontally from each other to form elongated chambers 268 and 269 to accommodate the fixed and traveling spacer blocks, and the movable members for actuating the spacer blocks, in a manner similar to the operation of the lower horizontal conveyor. Within chamber 268 is located traveling cam bar 235 for actuating traveling spacers 245. Cam bar 235 is formed as an inverted T with one leg of the T 270 extending into the space between vertical members 253a and 265, and the other leg 271 extending into chamber 269, vertical members 265 and 266 being provided with slots for this purpose. The upper horizontal face of leg 270 is formed as a rack 272 to be engaged by a pinion 273 secured to the right end of shaft 252, and as shaft 252 rotates pinion 273 first in one direction and then in the other due to the action of shaft 247, pitman 249, rack 250 and pinion 251, the engagement of pinion 273 with rack 272 reciprocates cam bar 235 and traveling spacers 245, and actuates the fixed spacer cam bar in the manner previously described to alternately propel and withdraw fixed spacers 245a and traveling spacers 245.

In order to provide a drive for the second set of traveling and fixed spacers in the upper conveyor, a second shorter shaft 274 horizontally in alinement with shaft 252 is journaled for rotation in vertical member 267 and in a vertical member 275 horizontally spaced therefrom. Vertical members 276, 277 and 278 laterally spaced from vertical member 275 form elongated chambers 279 and 280 to accommodate a second set of traveling and fixed spacers, and cam bars. Short shaft 274 is driven by means of a rack 281 integral with the horizontal leg 271 of cam bar 235, meshing with a pinion 282 secured to the left end of the shaft. A second pinion 283 mounted on the right end of shaft 274 in turn meshes with a rack 284 on a leg 285 of reverse L-shaped cam bar 235a, which reciprocates as shaft 274 rotates to propel and withdraw the second set of traveling spacers and to actuate the cam bar and the second set of fixed spacers.

The mechanism for elevating the upper horizontal conveyor and tray consists of a screw jack assembly 286 (see Figs. 45, 46 and 47), mounted upon the frame structure of the storage magazine and conveyors on the rear end thereof approximately midway between the near and far sides of the magazine (see Fig. 4). This mechanism comprises a pair of spaced vertical right angle members 287 having inwardly directed flanges 288 forming a guide rail for a vertically slidable plate 289 to which are secured brackets 290 having holes 291 for receiving trunnions 292 for pivotally supporting a motor housing 293. Plate 289 is provided with a central vertical bore 294 having threads to screw threadedly receive a vertical screw 295 which may be turned to raise or lower plate 289 and motor housing 293. The lower end of screw 295 is provided with a bevel gear 296 meshing with a bevel gear 297 mounted on a shaft 298 which is provided with a removable hand crank (not shown) to turn the shaft so that the motor may be vertically moved or adjusted. Although the elevating tray is automatically raised or lowered, it may also be moved manually by means of the hand screw. The means to automatically raise the elevating tray consists of a vertically upstanding motor shaft 299 of substantial diameter having its upper end screw threaded as at 300. An inverted cup shaped member 301 having internal threads 302 to mate with threads 300 is fitted over the upper end of shaft 299, and to the upper surface of cup 301 is secured a bracket 303 having a connection with the rear end of the elevating tray (see Fig. 4). In operating the device, the motor housing 293 is raised to its proper height and locked in this position by means of screw 295. When motor 293 is energized, shaft 299 rotates to cause cup member 301 to travel upwardly to thereby raise the rear end of the elevating tray so that the entire tray assumes the proper angle, whereupon a ram carriage engages the ogival end of the rockets to force each rocket within a tube in the link belt.

In order to index the rockets to the proper position to load them into the gun belt, the indexing rack or tray and conveyor must be elevated to 6°, which is the loading position, by the electrically operated screw jack. At the same time the rocket tube and gun belt are depressed to the 6° loading position, whereupon the ram mechanism, located directly above the upper conveyor and inclined 6° to the horizontal, is operated by its electric motor to push the rockets into the gun belt.

Referring to Figures 48-51 and to Figure 4, the ram mechanism comprises a plurality of horizontally spaced partitions 304 joined at each end to straps 149a and extending downwardly to a depth approximately equal to the diameter of a round to achieve a rack configuration 305 having 10 spaces equal in width and in vertical alinement with positions 1-10 on the upper horizontal conveyor. Rack 305 is inclined 6° to the horizontal from the front to the rear of the magazine as seen in Figure 4. An elongated housing 306 of a dimension slightly greater than the width of rack 305 is mounted above rack 305 at right angle to the barrel axis. Housing 306 is provided with parallel longitudinal slots 307 in its bottom side equal in number to partitions 304 so that each partition is loosely received within a corresponding vertically alined slot to permit fore and aft sliding of the housing 306. Within each compartment in rack 305 is disposed a split cylindrical tubular member 308 made integral with the rear wall of housing 306 and extending rearwardly (or to the right in Fig. 4) a short distance to engage the ogive of the rockets resting upon the elevator tray which has been elevated to loading position. Means are provided to move the ram mechanism comprising housing 306 and tubular members 308, forwardly and rearwardly along the upper surface of rack 305. The apparatus for moving the ram mechanism comprises a main drive shaft 309 (Fig. 26) horizontally supported in holes formed in strap 149a below the ram mechanism and extending along the forward wall of the magazine, and supported upon each end of shaft 309 are drive sprockets 310. Stud shaft 258 (which also doubles as the elevator pivot) and shafts 312 and 313 extend outwardly from each outside partition 304 for mounting idler sprockets 314, 315 and 316 and cooperating with the sprockets there are provided at either end of the rack 305, continuous chains 317 to engage the teeth of the sprockets in the well known manner. Ram mechanism 305 is provided with a bracket connection 318 to one of the links in the upper portion of chain 317 so that as the chain travels over the sprockets the ram mechanism is moved either forwardly or rearwardly. An electric motor 319 (Figs. 4 and 48) is mounted on the magazine frame structure directly beneath the center of drive shaft 309, and suitable power drive means (not shown) is also provided connecting the motor shaft with the ram mechanism drive shaft 309.

A telescoping mechanism 320 is also provided as part of the ram carriage as the carriage nears the end of its stroke to project the rockets a proper distance into the gun belt. This mechanism comprises a tubular member 321 telescopically received within each tubular member 308 slidably engaging the inner surface thereof and having its rearmost end 322 tapered to engaged the ogive of the projectile and to loosely fit within the gun belt tube. A chain drive 323, movable within a longitudinal slot 324 formed between the outer upper surface of telescoping tube 321 and inner surface of cylindrical tube 308, has one end connected as at 325 to the top of tube 321 and the other end wound about a sprocket 326, which is fixed to a shaft 327 (Fig. 51) extending the entire width of the ram carriage housing, each said sprocket being freely rotatable within a slot 328 in the top surface of housing 306. To rotate shaft 327 there are mounted thereon at each extreme end and in the middle thereof three gears 329 which mesh with three corresponding gears 330 mounted for rotation on an elongated shaft 331 in the ram carriage housing and rotatable either in clockwise or counterclockwise direction by a rack 332 with mating teeth. As seen in Figure 48, three racks are provided one for each of gears 330. Two of the racks are adapted to ride on the upper surfaces of end partitions 304 and a third rack is slidable on a middle partition 304. The extreme rear and front ends of partitions 304 are upwardly flanged to provide front and rear stops for the ram carriage, and additional stops are also provided near the end of the carriage stroke for each of the racks 332, to engage the front end of the rack whereupon gears 329 and 330 are rotated to rotate shaft 327 and to thereby play out chain 323 to advance telescoping tube 321 and to project each rocket its proper distance within the gun belt. On the return stroke, stops on the front end of partitions 304 return the racks 332 and tubes 321 to original position to prepare for the next loading stroke.

The mechanism which has been described in detail up to this point provides for the automatic feeding of rockets into the gun belt and for continuous movement of the gun belt in response to actuation produced by the exhaust gases of a fired rocket, to feed the next rocket automatically to the firing position. In the event a dud is encountered during the firing operation, the gun belt mechanism will cease to operate in view of lack of exhaust gases and because of the braking action of brake gear 68 cooperating with gear 67 and driven clutch member 47, which has been returned to disengaged position by the failure of the dud to actuate the muzzle trip lever 33, and clutch operating rod 40. In order to prepare the gun belt mechanism for re-firing, the belt must be cycled one position to place the dud in the dud ejection position, whereupon the dud ejection mechanism is operated to push the dud into a tray mounted externally of the gun. Referring to Figures 53–55, and Figure 52 taken in connection with Figure 12, the dud ejection mechanism comprises previously described combination brake and clutch 69a comprising driven disc and brake drum 70 mounted on shaft 69 adapted to be engaged by a driving clutch plate 71 mounted on a shaft 72 which extends into and is journaled in a dud ejection gear housing 333 upon the end of which is secured a bevel gear 334, which meshes with a bevel pinion 335 mounted upon a shaft 336 having one end extending toward the left as seen in Figure 52 to be journaled in the right wall of a second gear housing 338. A bevel pinion 339 is mounted on the left end of shaft 336 to mesh with a bevel gear 340 which drives a shaft 341 upon which is secured a spur gear 342 meshing with spur gear 343. Concentric with spur gear 343, a worm 344 driven thereby, in turn drives a worm gear 345 secured to shaft 346 upon which is mounted a spur gear 347 which meshes with a spur gear 348 mounted upon and to rotate a dud ejection drive shaft 349. Axially spaced along shaft 349 are a pair of helical gears 350 and 351 meshing with opposed motion helical gears 352 and 353 which are mounted respectively on shafts 354 and 355 disposed at right angles to shaft 349 (see Fig. 55). A sprocket 356 (Fig. 53) is mounted upon shaft 354 for driving one section 357 of a double link chain, and in like manner a second sprocket 358 for driving a second portion 359 of the double link chain is mounted upon shaft 355. Contiguous ends 360 and 361 of chains 357 and 359 are connected to a dud rammer 362 whereas the opposed ends 363 and 364 of the chains are connected in the well known manner to conventional tension maintaining winding and reeling apparatus (not shown). As shafts 354 and 355 are rotated in opposed direction to drive chains 357 and 359, rammer 362 is projected first to eject a dud and then withdrawn to be stowed in a recess 365 provided in the frame 366 for supporting the ram drive chains and driving mechanism (see Fig. 54). Suitable means in the well known manner are also provided in frame 366 for guiding chains 357 and 359. Rammer 362 which is a flat disc shaped member 367 having a forwardly extending reduced portion 368 is slidable within a tubular member 369 in axial alinement with that one of the gun belt tubes which has been cycled to the dud ejection position. Since no exhaust gases are present to cyle the gun belt when a dud is encountered, electrical means (Fig. 52) have been provided to cycle the gun belt to the dud ejection position. This means comprises dud index motor 73 mounted externally of housing 333 on the right side thereof, and a motor shaft 371 upon which is mounted a pinion 372 meshing with a gear 373 secured to the right end of shaft 336. In order to provide for the different drive positions to cycle the belt and to eject a dud, an involute spline dud eject clutch 374 is slidably mounted upon shaft 346, and comprises a collar 375 integral with gear 347 and a linkage connection 376 to collar 375 for the purpose of sliding clutch 374 upon splined shaft 346 into and out of clutch position, in the well known manner, and at the same time moving gear 347 into and out of engagement with gear 348. Clutch linkage 376 extends downwardly and is provided with a second horizontal connection 377 to a linkage 378 which is connected to a manual control to the operator station (not shown), and a third connection 379 to combination brake and clutch 69a (see Fig. 12).

The mechanical operation of the dud ejection mechanism will now be described with particular reference to Figures 12 and 52, and also Figure 7. Since muzzle trip lever 33 is not in any way affected by a dud, clutch operating rod 40 will return to its normal position in response to the urging of spring 66, and clutch discs 44 and 48 will no longer be engaged, whereupon gear 67 and acting through gear 68 will actuate the combination brake and clutch 69 to immediately stop the gun belt. The operator at the control station now moves the linkage to manual cycling position and by virtue of connections 375, 377, and 378 the dud eject clutch 374 is declutched, and at the same time by virtue of linkage 379 clutch plates 70 and 71 are moved into engagement. When motor 73 is energized, the drive proceeds through gears 372 and 373 to shaft 336 and then through miter gears 335 and 334 to shaft 72, then through the clutch to shaft 69 (Fig. 12) finally through the intermediate gears and shafts through shaft 56 to the mechanism previously described for moving the gun belt. The abutting engagement between brake drum 70 with braking surface 70a as the gun belt is being cycled one position provides a friction engagement to insure a slow movement and control of the gun belt. When the belt has been cycled to the dud eject position, the linkage is now moved to the dud ram position, and in this position clutch 69a is disengaged whereas clutch 374 is engaged, whereupon energization of motor 73 drives shaft 371 and the drive proceeds through gears 372 and 373 to shaft 336, then through miter gears 339 and 340, and associated gears described in connection with Figures 52–55 and finally to gear 348 and shaft to project rammer 362 to eject the dud. Reversal of motor 73 then withdraws the rammer and the gun is now ready for automatic firing of the remaining rockets in the gun belt.

In the hereinabove description, cycling of the gun belt for automatic firing by virtue of a blast turbine operated by the exhaust gases from a rocket that has been fired, has been fully explained. The control system for loading the gun belt, for operation of the conveyors, for dud ejection, for moving the gun in elevation and train, and for visual indication of the operating conditions of the gun are electrically operated. Since this control system forms no part of the present invention, it will be described briefly. A main control panel consisting of gunner control station 380a and magazine control box 380b (Fig. 56) is located within view and easy reach of the gunner, and provides a visual indication of operating conditions at all times. The number and position of rounds in the gunbelt and loading or elevating tray are shown by the use of white indicator lights 381. A counter 382 shows the number of rounds remaining in the magazine. A green light 383 at the "ready to fire" indicator signifies that the gun is ready to fire, and if a dud is encountered a red light 384 will flash to indicate a dud and the mechanism will stop.

The actuation of the gun belt indicator lights is accomplished by the use of contactors 139 located in the gun belt tubes (see Fig. 23). If a rocket is in the tube, the indicator lights for that position will be on. These same contactors are used to initiate the signal for the cycling of the automatic feed mechanism.

The magazine round counter 382 is solenoid actuated and receives its signal from a contactor at the loading tray. Whenever a round is placed on the loading tray contact is made and the counter registers one less round in the magazine. The counter is set by hand to the number of rounds in the magazine system at the time of loading. The "ready to fire" indicator 383 is interlocked with several switches in the various systems (not shown) for gun aiming and laying, fire control loading and dud ejection, in order to insure the safe and accurate operation of the mechanism. The following conditions must therefore be fulfilled before the gun will fire (1) the master switch 385 must be "on"; (2) arm-safe switch 386 must be moved to "arm"; (3) a round with an energized squib must be in the firing position; (4) the clutch control handle 387 comprising normal cycle position 387a and auto-cycle and ram position 387b must be in the "autocycle" position; (5) magazine control box switch 388 must be in the "gunner station" position; a gun sight switch (not shown) must be in the "on" position; (7) the gun must not be in the dud eject or loading cycle.

When a dud is encountered, the "high voltage" firing switch 389 is first actuated and the trigger firing switch 390 is closed. If this does not fire the rocket, the dud ejection system must be used. The clutch is placed in the "manual cycle" position 387a and the forward "cycle gun belt" switch 391 is closed. This will cycle the gun belt one position and place the dud in the "eject dud" position. A contactor at this point is interlocked with the other controls except "eject dud" so that only the "eject dud" operation is possible. This insures that the dud must be removed before any further firing or operation can be done. The clutch is now placed in the "dud ram" position 387b. Closing of an "eject dud" switch 398 operates a sequence system (not shown) which first relates the gun to zero degree position and then energizes the ram motor 319 for ejecting the round to a receiving tray outside the tank. The system is now ready to resume firing.

The magazine control box 380b (Fig. 56) is located near the magazine loading latch and is used in arming the system. When the magazine control box switch 388 is in the "magazine station" position, the gunners control panel 380a is inoperative. The feed mechanism can be operated by the "cycle magazine" switch 392 for feeding rockets into the system. The "load rocket belt switch" 393 will operate the ram mechanism for transferring rounds from the elevating tray to the gun belt. The "cycle gun belt" switch 397 (in the magazine control box) will move the first ten rockets to the firing position so that the total of twenty rounds may be placed in the gun belt.

In normal operation the gun firing is halted after ten rounds by the action of the rocket position indicator contactors. The normal cycle is to reload the belt but provisions have been made to fire the other ten rounds in the belt without reloading, by closing the circuit with the emergency switch 395 located in the fire control handle 396. If this procedure has been followed and any rounds remain in the gun belt when reloading is desired, the "reverse cycle gun belt" switch 394 is actuated to energize the motor 73 to rotate the belt in reverse. The reverse cycling is stopped when the first round has reached position number 11 (Fig. 56). The gun belt can be reloaded and normal operation resumed.

The automatic rocket feed system is interlocked electrically with the gun belt mechanism. When an empty rocket belt tube reaches position number 1 (Fig. 56), the contactor will energize the magazine elevator motor 195, and the mechanism will place a rocket on the loading tray in line with the empty rocket belt tube. Contactors at each position of the loading tray will light the indicator lights on the control panel whenever a rocket is in that position, enabling the gunner at all times to visually check the proper functioning of the feed system.

The transfer of rounds from the elevating tray to the rocket belt is accomplished by closing the "load rocket belt" switch 393 on the control panel to energize a sequence system (not shown). The gun elevation motor 18 and the tray elevating motor 293 will first be energized. The gun will rotate to the −6° loading position and the tray will raise to the 6° position. The ram carriage will then propel the rockets into the gun belt and return. The gun will now return to the previous battery position unless the control handle 396 has been changed.

For the fire control system, a computing type sight may be used in conjunction with stabilization of the gun in elevation, as for example a gyro stabilizing system such as is common in some of the present tanks. See U.S. Patents 2,532,333 and 2,532,334. The gun control for the automatic rocket launcher is an electrical servo system (not shown) interlocked with the gyro stabilizing system and the hand control unit. The sight is operated by the gun barrel and follows it except for the corrections made by the sight mechanism to allow for angle between the bore and the target. The hand control 396 is connected to the gyro stabilizing system so that the angle between the reference, or horizon, and the line of sight is controllable. Since the gun servo system will follow the predetermined angle set in the gyro control, the gun will stay at the correct elevation angle even though the tank has pitching motion. The computing sight will also correct for the speed of moving objects if the gunner provides the correct range data and accurately tracks the target.

The gun is operated in elevation by an electrical servo motor. In azimuth, the normal tank electrical-hydraulic system is used. Thus high speed operation for quick target change is provided. A high speed sluing switch 399 provides for rapid operation of the gun in azimuth and in elevation.

*Operation*

The general overall operation of the automatic rocket launcher control system will now be described in detail, including the steps of loading, sighting, firing, dud ejection, and when necessary, deloading.

In normal operation, the rockets are loaded into the magazine by lowering the clips through the loading hatch at the number 10 position as seen in Figure 26. When nine clips each containing seven rockets, have been placed in the magazine, the retainer pin in the first clip (position number 10) is removed and the "master" switch 385 turned on. The "arm" switch 386 should be on "safe." By operation of the "cycle magazine" switch 392 (Fig. 56), the seven rockets are transferred from the first clip to the loading system. The empty clip is replaced with a full one and the operation is repeated until the loading system is filled, at which time the loading cycle will stop. At this time the "load rocket belt" switch 393 is actuated. The gun will now rotate in elevation to the gun loading position (minus 6°) whereupon ten rockets are rammed into the gun belt by the ram carriage. The "cycle gun belt" 397 is then actuated to place the first rocket in the belt in the firing position. Since more rockets are being fed into the system during this operation, the clip in the number 10 position is replenished when it becomes empty. Actuation of the "load rocket belt" switch 393 will now place 10 more rockets in the gun belt. When the empty clip has been replaced with a loaded one, the loading operation is completed. There are now 20 rockets in the gun belt and 80 rockets in the loading system. The launcher is therefore fully armed and ready for battery.

Reloading the magazine can be accomplished after any number of rounds have been fired. The empty clips are removed and replaced with loaded clips, and any partially loaded clips must also be replaced in order to maintain continuity of fire. The indicator system (Fig. 56) will inform the gunner of the number of rounds and their position in the belt at all times. For emergency operation, the gun belt may be directly loaded by hand, and provision is also made for operating the entire system by means of hand cranks.

The sight unit (not shown), which may be any one of a well known kind useful for accurate tracking of moving targets such as enemy tanks, is mounted inside the turret in a position convenient to the gunner. A periscope transfers the line of sight outside the turret, and a gun control handle 396 (Fig. 56) is provided to operate the mechanism to move the turret in azimuth and the gun in elevation. Also, the fire control is mounted in the control handle.

In addition to direct sighting the range and azimuth scales of a gunners quadrant can be used to lay the weapon.

In firing the weapon, the gun is first placed in "ready to fire" condition, by first actuating the "master" switch 385 and "arm safe" switch 386. Compression of the fire control trigger will close switch 390 to fire a rocket and start the blast turbine and gun mechanism. Continued compression will produce a continued volley, even as the change of range and tracking of a target is in progress. Under normal conditions a burst of ten rounds or less is used. After a burst of ten rounds the actuation of the load rocket belt switch 393 will automatically place the gun in the loading position and load the belt with ten rounds and return the gun to its original position if the control handle 396 has not been moved. Operation of the control handle will place the gun in the desired position in elevation and azimuth for further firing. In this particular design, reloading varies from 6 seconds at maximum elevation to 4 seconds when the battery position is near the loading position. The gun may be returned from loading position to maximum elevation in 2 seconds. If desired the belt may be reloaded after firing any number of rounds less than ten by depressing the loading switch.

In case of emergency more than ten rounds may be fired without reloading by actuating the emergency switch 395 in the control handle (Fig. 56). If more than ten rounds are fired, the "reverse cycle gun belt" switch 394 is used to return the gun belt to the proper position for the loading cycle.

If a dud is encountered any time during the firing operation, the mechanism will stop and the indicator lights will show a round in the firing position. The red "dud indicator" light 384 will be on and the "ready to fire" light 383 will be off. The "dud high voltage" switch 389 is actuated, and if this does not fire the dud the gunner lets a short period of time elapse to insure against "hang fire." The "forward cycle gun belt" switch 391 is then depressed to place the dud in the "dud eject" position. The clutch shaft should be in the "manual cycle" position 387a at this time. The clutch shaft is then turned to the "dud ram" position 387b and the "eject dud" switch 398 is depressed. The dud will be ejected outside of the turret and onto the dud storage tray, and the system is now ready to fire.

The rockets may be safely removed from the entire system if so desired. To do this, the rounds still remaining in the clips inside the magazine are first removed. This is done by reversing the outlined procedure for loading the clips into the magazine. With the "arm" switch 386 in the safe position the same procedure used for dud ejection is followed except that the "dud high voltage" is not applied. Thus the rockets are removed from the gun belt and feed mechanism by ejecting them one at a time into the dud tray.

Figures 57, 58, 59 and 60 represent schematically the various electrical connections and switches for loading and unloading, cycling the gun belt, ejecting a dud, elevating, depressing and sluing the gun, and for firing the rockets. The operation of each circuit is described in itemized detail in the following paragraphs for clarity and simplicity.

Referring to Figure 57 which represents the load cycle circuit, (1) Actuation of circuit to load rockets from tray to rocket belt is initiated by pressing "load rocket belt" switch 404.

(2) Current flows from 24 v. source (wire #400) through contact 401 of mechanical latch relay 402 through wire number 403 to "load rocket belt" switch 404 which has been actuated. Current now flows to mechanical latch relay 405 and actuates this relay.

(3) Contact 406 (interlock circuits) are opened. Contact 407 is opened which releases control of the elevation motor 18 from the elevation gyro stabilizer and training servo-control.

(4) Contact 408 is closed which allows current to flow from source wire 400, through contact 401, through wire 403, through contact 408, to load position switch 410, and through wire 411 to "tray up" switch 421.

(5) Current now flows from load position switch 410 through sensing switch 412 which is as shown when the gun is elevated above $-6°$ depression and which is actuated to "other position" from that shown when the gun is below $-6°$ depression.

(6) Current will now flow from the sensing switch 412 to either the down gun load coil of DTDP relay 413 or the up gun coil of this relay so that the elevation motor 18 will "train" the gun to the loading position.

(7) Actuation of relay 413 allows current to flow from wire 400 through reversing DTDP relay 413 to gun load coil of relay 414 which actuates relay 414 permitting current to flow to elevation motor 18 armature.

(8) The elevation motor now brings gun either up or down according to sensing switch 412 until the loading position is reached at which time the loading position switch 410 is actuated as a limit switch.

(9) Actuation of switch 410 interrupts current to relay 413 which in turn interrupts current to relay 414 which in turn stops elevation motor at the load position.

(10) Actuation of switch 410 also allows current to flow to relay 415 which closes contacts 416 and allows current to flow through wire 417 to contacts 418 of relay 419.

(11) As stated in item 4, current is at "tray up" switch. This current continues to up tray coil of relay 420 and actuates the relay so that current flows from source wire 400 through relay 420 to tray actuating motor 293.

(12) This motor now elevates the tray until the "tray up" switch 421 is actuated when the tray is at a 6° elevation.

(13) Actuation of tray up switch 421 interrupts current to relay 420 which interrupts current to tray actuating motor 293 and stops movement of the tray.

(14) Actuation of "tray up" switch 421 also causes current to flow to relay 419 which closes contacts 418 and allows current to flow to relay contacts 423 and to ram switch 424.

(15) Current now flows through contacts 425 to ram coil of relay 426.

(16) Actuation of relay 426 energizes ram actuating motor 319 and loads rockets from tray to rocket belt.

(17) At the end of the ram stroke the ram switch 424 actuates which interrupts the current to relay 426 and stop motor 319.

(18) The ram switch 424 also actuates relay 428 which closes contacts 423.

(19) This closing of contacts 423 allows current to flow to mechanical latch relay 402 and actuates this relay 402.

(20) Actuation of relay 402 opens return cycle load interlock contacts 420; contacts 430 which prevents tray actuating motor from raising tray; contacts 401 which interrupts current to load rocket belt switch 404, mechanical latch relay 405, gun train coil of relay 414, current in coils of relays 419, 428 and 415.

(21) The interruption of current in the coils of relays 419, 428, and 415 causes contacts 416, 418, and 423 to open which interrupts current to the coil of the mechanical latch relay 402. However, since this relay 402 is already actuated and mechanically latched, its contacts do not change position.

(22) The actuation of relay 402 closes contacts 431.

(23) The closing of contacts 431 allows current to flow from source wire 400 through contacts 431 to ram return switch 432.

(24) When the ram is at its normal position the ram return switch is as shown. When the ram moves to ram rounds into the rocket belts, this switch 432 is actuated.

(25) Current now flows through switch 432 to return ram coil of relay 426.

(26) The actuation of relay 426 by the return ram coil causes ram actuating motor s19 to return the ram to its initial position.

(27) When the ram has cleared the rocket belt, the ram clear switch 433 is momentarily actuated which allows current to flow from source wire 400, through contacts 431, through switch 433, to holding relay 434 for this described circuit, and to wire 435.

(28) From wire 435 the current flows to the release coil of mechanical latch relay 405 which returns the contacts to the position shown in Fig. 57.

(29) Release of the relay 405 to its normal position closes interlock contacts 406 and contacts 407.

(30) From wire 435 the current also flows to the "down tray" switch 436.

(31) This switch 436 is only in the position shown when the tray is in the down position. Therefore, current now flows through 436 to the drown tray coil of relay 420 causing current to flow from source wire 400 to the tray actuating motor 293 in such a manner as to lower the tray.

(32) The motor 293 will continue to lower the tray until at its limit of travel, the "tray down" switch 436 will return to the position shown. This interrupts the circuit to relay 420 and consequently to the tray actuating motor 293 causing the motor to stop.

(33) The return of the tray down switch 436 causes current to flow to relay 437 closing contacts 438.

(34) During the operations 28–33 inclusive, the ram is returning as described in item 27. The action continues until the ram is at its returned position. At this position of the ram, the "ram returned switch" 432 returns to the position shown in Fig. 57.

(35) The return of switch 432 allows current to flow to relay 439 which closes contacts 440.

(36) Current now flows from source wire 400 through contacts 431, through contacts 440, through contacts 438, to the release coil of the mechanical latch relay 402 which returns the contacts 429, 430, 401, 425, and 431 to the position as shown in Fig. 57.

(37) The closing of contacts 401 allows current to flow from the source wire 400 through contacts 401, contacts 407 and to gun train coil of relay 414. This returns control of the elevation motor 18 to the elevation gyro stabilizer and training servo.

(38) The opening of contacts 431 causes relays 439, 434, and 436 to drop out and the contacts of these relays to open.

(39) Briefly, the electrical system has caused the "in sequence" operation of lowering the gun to −6° depression, the raising of the tray to 6°, the ramming of rounds from the tray to the rocket belt, the return of the ram and tray and the return of the elevation control to the sighting mechanism.

Operation of the magazine cycling circuit 2nd rocket position indicator circuits is as follows (see Fig. 58).

(1) The rocket belt switches and their lights 441–461 inclusive, indicate to the gunner the position of the rockets in the rocket belt. When a rocket is in the belt at the position indicated, the light at that position is on. The functioning of this circuit, which is merely a switch in series with a light, is obvious.

(2) The function of the rest of the circuit is to automatically place a rocket on the tray and progress the rocket along the tray; so that as a rocket position in the belt is empty, a rocket will be on the tray ready for ramming into the belt.

(3) It is anticipated that the rocket belt will cycle faster than the magazine will cycle. Therefore, the circuit is constructed to accommodate the difference in cycling rates.

(4) Current flows from source wire 462 through last round switch 499, through magazine interlocks 500, through switches 472, 471, 470, 469, 468, 467, 466, 465, 464, and 463, successively.

(5) When a rocket is not at position "one" in rocket belt, switch 463 is actuated, when a rocket is not at position "2" in rocket belt, switch 464 is actuated and so on until when no rocket is in position "10" in rocket belt, switch 472 is actuated.

(6) As each switch 463–472 inclusive, is actuated its associated "hold in" relay 473–482 inclusive, maintains the current flow from wire 462 through the last switch and/or "hold in" relay that is actuated, to the associated rocket tray switches 483 to 492 inclusive.

(7) If there is no rocket in the tray at the position of the last operated rocket belt switch, current will flow through this switch and/or its associated "hold in" relay, through its associated rocket tray switch, to wire 493.

(8) From wire 493 current flows through contacts 495 of relay 494 to cam switch 496.

(9) The cam switch 496 is driven by a shaft of the magazine cycling mechanism. This cam rotates one revolution for each cycle of the magazine mechanism which advances the rocket in the magazine one position. The cam is shown in Fig. 59 at a position corresponding to the end of the magazine cycle.

(10) Current now flows through the contacts of cam switch 496 to the coil of the motor contactor 498.

(11) Actuation of the contactor 498 energizes the magazine cycling motor 195 shown in this figure and in Fig. 27.

(12) This motor rotates the magazine mechanism and drives cam switch 496 at the magazine cyclic rate.

(13) When the cam of the cam switch 496 rotates a few degrees the switch is actuated and current then flows directly from wire 462, through switch 499, through interlocks 500, through cam switch 496, to motor contactor 498.

(14) Switch 496 then effects the energizing of motor 195 until the end of a cycle is completed when switch 496 returns to the position shown in Fig. 58.

(15) As the cycling of the magazine places rockets on the tray and moves them along the tray, switches 483 to 492 inclusive, will actuate successively, and will interrupt the circuit from wire 462 to wire 493, and will close the circuit from wire 462 to the corresponding light, indicating a rocket is now at this position on the tray.

(16) The magazine motor will now repeat its cycling process until the position of the rockets on the tray have reached the position of the last actuated switch 463–472 inclusive.

(17) This operation just described depends on the magazine station switch 501 being as shown in Fig. 58 which transfers control of the magazine cycling operation from the magazine station control box to the gunners control box.

(18) When the last round is out of the magazine and the rocket tray switch 499 opens, the cycling of the magazine is interrupted since there is no longer any need for this mechanism to operate.

(19) The magazine can be cycled from the magazine control box in the following manner:

(20) Close switch 501 which actuates relay 494 and opens contacts 495 and close contacts 502.

(21) Current flows from 462 through magazine interlocks 500 to magazine cycle switch 508.

(22) Although switch 508 may be pressed momentarily or continuously, only one cycle of the magazine will occur. The switch 508 must be pressed again for each cycle.

(23) Current now flows through contacts 505 of mechanical latch relay 506, through contacts 503, through contacts 502, and then through cam switch 496, to contactor 498.

(24) Actuation of contactor 498 cycles the magazine in the already described manner.

(25) "Hold in" relay 507 allows current to flow from contacts 505, through contacts of relay 507 allows current to flow from contacts 505, through contacts of relay 507, to contacts 502 and on to the motor contactor even though switch 508 is actuated only momentarily.

(26) When cam switch 496 rotates and actuates contacts of the switch, current flows from 462, through cam switch 496 contacts, to mechanical latch relay 506.

(27) Actuation of relay 506 interrupts current to hold in relay 507 and this relay drops out.

(28) When magazine cycle switch 508 is released current flows to the release coil of mechanical latch relay 506 and causes contacts 505 to reclose, and restore the circuit so that it is ready for the next magazine cycling operation.

The operation of the electrical current to remove a dud round is as follows (see Fig. 59).

(1) Initiation of this process of ejection is effected by the "eject dud switch" 398 which causes the gun to train to the eject dud position either by raising or lowering the gun; which next causes the dud eject ram to remove the dud from the rocket belt; which further causes the ram to be withdrawn to its initial position; and which then causes the elevation control of the gun to be returned to the control of the elevation stabilizer and servo control.

(2) Current flows from wire source 510, through cam switch contacts 511, through "rocket in dud" position: switch contacts 514, to eject dud switch 398.

(3) When this switch 398 is depressed, mechanical latch relay 517 is actuated which changes the contact position of 618, 519, and 520 contacts. This relay and its contacts are inserted into circuit shown on Fig. 57 between sending switch 412 and relay 413 as indicated on Fig. 59.

(4) Actuation of relay 517 also closes contacts 523.

(5) Current now flows from source wire 510, through contacts 523, through contacts 518, through "dud eject angle of gun limit switch" 522, to sense switch 521.

(6) When gun is above the "eject dud" angle, this switch is as shown. When the gun is below the "eject dud" angle, this switch is in the actuated position.

(7) Current now flows through either contacts 520 to lower the gun, or contacts 519 to raise the gun, to the "down gun" or "up gun" coils of contactor 413, Fig. 57.

(8) The circuit now operates as described in item 7, 8, and 9 of operation of load cycle circuits and the gun is brought to the "eject dud" position at which point the motor is stopped by actuation of the "dud eject angle of gun limit switch" 522.

(9) Actuation of switch 522 causes current to flow to "eject dud" limit switch 524.

(10) Current continues through contacts 525, to contacts 526 of "clutch shift" switches 387.

(11) The "clutch shift" switches are now actuated by "clutch shift" handle 387 Fig. 56 being placed at 387 B.

(12) Current flows from contacts 525, through contacts 526, to contactor coil 529. This contactor then closes the circuit to the "dud eject" motor 73 which ejects the dud.

(13) At the end of the "dud eject" stroke the "eject dud" limit switch 524 is actuated which interrupts the current to contactor 529 and stops the motor 73.

(14) Actuation of switch 524 causes current to flow through mechanical latch relay 516 which opens contacts 525 and closes contacts 530.

(15) The "return dud" ram limit switch 531 is actuated when the dud ram starts to move. Therefore, the current flows from contacts 524, through contacts 530, through contacts 531, through contacts 527, to reversing coil of motor contactor 529.

(16) The contactor actuates the motor 73 and returns the "eject dud ram" to its initial position.

(17) "Return ram" limit switch 531 stops the motor 73 at the end of its stroke and causes current to flow to release coils of mechanical latch relays 516 and 517 which returns the circuit to its initial condition.

(18) However, since "rocket in dud position switch" now has contacts 515 closed and contacts 514 open the eject dud switch 398 will not initiate another cycle upon actuation.

Referring again to Figure 59 the forward cycle gun belt circuit operation follows:

(1) Actuation of this circuit by switch 532 "forward cycle gun belt" causes one forward cycle of gun belt.

(2) "Clutch shift" 387 is in position shown in Fig. 59.

(3) Current flows from source wire 510 through cam switch 511, through contacts 515, through contacts of relay 534, to "make contacts" of forward cycle gun belt switch 532.

(4) Actuation of switch 532 causes current to flow through contacts of mechanical latch relay 513, to coil of mechanical latch relay 514 which actuates this relay.

(5) Current also goes through contacts 526 and to motor contactor.

(6) Actuation of motor contactor 529 causes motor 73 to cycle rocket belt one cycle.

(7) As the rocket belt begins to cycle the cam switch 513 actuates and closes contacts 512.

(8) Current flows through relay coils of mechanical latch relay 513 which actuates this relay and opens the contacts of this relay which interrupts current from switch 532 to motor contactor 529.

(9) However, the current to the motor contactor 529 is reestablished through cam switch contacts 512, through contacts 528, through contacts 535, through contacts 536, through contacts 526 and to motor contactor.

(10) At the end of the belt cycle the cam switch 513 returns to the "as shown" position and the current is interrupted to the motor contactor 529 which stops motor 73.

(11) Also current flows through contacts 511, through the back contacts of "reverse cycle gun belt switch" 533, through the back contacts of the "forward cycle gun belt switch" 532, to the release coils of mechanical latch relays 513, 514, and 515 which restores the circuit to the initial conditions ready for another cycle of the gun belt.

(12) When a round reaches the firing position, the firing circuit interlock is energized which actuates relay 534 and prevents further cycling of gun belt forward.

(13) The circuit is arranged so that simultaneous actuation of forward cycle gun belt switch 532 and reverse cycle gun belt switch 533 will not cause damage to the electrical circuit.

The reverse cycle gun belt circuit is also delineated on Figure 59 and operates in the following manner:

(1) Actuation of "reverse cycle gun belt switch" 533 causes current to flow through contacts 511, contacts 515, through "round in position No. 11 switch" 537, through "reverse cycle gun belt switch" 533, through contacts of relay 513, through contacts 527, and to the reverse contactor coil of relay 529.

(2) This contactor actuates the motor 73 in the reverse direction to reverse cycle the gun belt one cycle.

(3) Current also flows through coil of mechanical latch relay 515 which opens contacts 536 and closes contacts 539.

(4) When cam switch 513 driven by motor 73 actuates the switch to close contacts 512 and open contacts 511, the current to the motor contactor 529 is maintained through contacts 512, 528, 538, 539 and 527.

(5) At the end of the cycle the cam switch 513 is actuated to open contacts 512 and close contacts 511. This interrupts the current to the contactor, stops the motor 73 and returns the mechanical latch relays 513, 514, and 515 to their initial positions by actuation of their release coils as described in item 11 "operation of forward gun cycle belt electrical circuits," column 28.

Figure 60 illustrates the operation of the firing circuits.

(1) The energy source is from 24 v. wire 540 through firing circuit interlocks to "belt loading positions empty 1 to 10" switch 541 and emergency switch 395.

(2) If there is a rocket or rockets at positions one to ten, then switch 541 is closed and power proceeds to firing switch 390.

(3) Actuation of firing switch actuates firing relay 542 and closes contacts 543.

(4) Current now flows through contacts 543, through high voltage switch 389 to cam switch 65A.

(5) If the launcher is cycled properly as previously described (see Fig. 7), then contacts of switch 65A will be closed and current will proceed to the arming switch 386.

(6) If the switch 386 is on "arm" then current will proceed to the rocket and fire it.

(7) In case of a dud round, before the dud is ejected, the rocket squib may be energized with a high voltage current in the following manner:

(8) The high voltage switch 390 is thrown to opposite position from that shown in Fig. 60.

(9) Current now flows through iron core inductance 543, through contacts 544, to ground 545. This current flowing in inductance 543 stores up energy in the magnetic field of the inductance.

(10) When the firing switch 390 is actuated, which actuates the firing relay 542, contacts 544 are opened and energy in the magnetic field of inductance 543 flows through the high voltage switch, to switch 65A, through the arm switch 386, and to the rocket squib.

(11) This circuit is similar to the high voltage ignition circuit, of an automobile and the spark energy will be of the same magnitude.

(12) The emergency switch 395 allows the gunner to fire all 20 rockets in the belt. This is done by paralleling the emergency switch with the switch 541 which normally stops the firing when the first ten rocket belt positions are empty of rockets.

The automatic launcher of this invention is mechanically capable of firing at the rate of 250 rounds per minute in burst of ten rounds with a short period elapsing for reloading and consequent cooling of the heated parts. Under emergency conditions a burst of twenty rounds is also within the scope of the design. The entire automatic launching system is a single, self-contained unit, easily manipulable, safe to handle and of great fire power. The feed mechanism is designed to positively hold the rockets at all times, thus they are never free to roll, slide or move except by positive mechanical actuation, therefor the possibility of malfunctioning is decreased.

While a combat tank has been shown as the mount, it will be understood that this is by way of illustration only, and that the launcher may be mounted upon a truck, half-truck or other vehicle or may be mounted in a fixed emplacement such as a "pill box." In addition, other modifications and alterations of the structure disclosed herein will be apparent to one skilled in the art, and it is obvious that the same may be made without departing from the spirit and scope of the invention as defined in the following claims.

We claim:

1. In an automatic rocket launcher, a single barrel launcher tube, a continuous gun belt having a plurality of contiguous interconnected rocket carrying tubes adapted to successively feed rockets into said launcher tube, means associated with said gun belt for indexing each said rocket carrying tube from rocket loading position to firing position in alignment with said launcher tube, means including an electric firing circuit for firing a rocket located in firing position, blast operated means adjacent the breech end of said launcher tube adapted to drive said belt indexing means, a normally disengaged clutch interposed between said blast operated means and said indexing means, said clutch comprising a driving plate connected to said blast operated means, a driven plate connected to said belt indexing means, a trip lever extending into said launcher tube and interposed in the path of a rocket travelling up said tube, means positively and directly connecting said trip lever and said driven plate and responsive to contact with the surface of a rocket passing up the launcher tube to effect engagement of said clutch, a rocket storing magazine in said launcher, and means cooperating with said gun belt for loading said launcher comprising, a rocket storing magazine in said launcher, a rocket indexing tray pivotally mounted on said magazine, a ramming mechanism associated with said tray and electrically operated means adapted to move rockets out of said magazine and onto said indexing tray, elevating said tray into a loading position with said gun belt whereby said rockets are rammed into said gun belt by said ramming mechanism.

2. In an automatic rocket launcher, a single barrel launcher tube, a continuous gun belt having a plurality of contiguous interconnected rocket carrying tubes adapted to successively feed rockets individually into said launcher tube, means associated with said gun belt for indexing each said rocket carrying tube from rocket loading position to firing position in alinement with said launcher tube, means including an electric firing circuit for firing a rocket located in firing position, blast operated means adjacent the breech end of said launcher tube adapted to drive said indexing means, a normally disengaged clutch interposed between said blast operated means and said indexing means, a trip lever on said lanucher tube adjacent the muzzle end and projecting into the path of travel of a rocket passing up said launcher tube, a clutch operating rod having one end connected to said muzzle trip lever and the other end pivotally connected to a lever adapted to effect engagement of said clutch in response to a continued burst of a plurality of fired rockets, spring means secured to said clutch operated rod resiliently biased to normally move said rod out of engagement with said clutch, and rocket loading means for said launcher comprising a magazine in said launcher, a rocket indexing tray pivotally mounted in said magazine intermediate said magazine and said gun belt, a ramming mechanism associated with said tray and electrically operated means adapted to align said tray and said gun belt into a loading position, moving rockets out of said magazine onto said tray and actuating said ramming mechanism to ram said rockets from said tray into said gun belt.

3. In an automatic rocket launcher including a single barrel firing tube and a gun belt having a plurality of contiguous interconnected rocket carrying tubes, the combination with means for indexing each rocket carrying tube in the gun belt from loading position to firing position in alinement with said firing tube, and blast operated means for driving said indexing means, of a normally disengaged clutch interposed between said blast operated means and said indexing means, and means to effect continued engagement of said clutch rendered operative by a succession of rockets passing through said firing tube to effect automatic indexing and firing of each succeeding rocket, said gun belt indexing means comprising an intermediate shaft adapted to be driven by said blast operated means when said clutch is engaged, a bevel gear on said intermediate shaft, a belt drive shaft at right angles to said intermediate and having secured thereon a bevel gear meshing with the bevel gear in said intermediate shaft, each opposed end of said belt drive shaft having keyed thereon an eccentric rotatable therewith, a support member freely rotatable about each said eccentric, a sprocket secured to each said support member adapted to engage links on said gun belt, an internal gear secured to said support member axially inwardly of said sprocket member, an external gear about said belt drive shaft meshing with said internal gear, and an idler shaft horizontally removed from said belt drive shaft and mounting an idler sprocket adapted to engage said links on said gun belt.

4. The combination in claim 3 wherein said external gear is freely rotatable with respect to said belt drive shaft, torque tube means rotatable about said belt drive shaft secured to said external gear, and cam means driven by said intermediate shaft in timed relation to the speed of said belt drive shaft adapted to engage and to oscillate said torque tube and external gear in timed relation to the speed of said belt drive shaft whereby said gun belt is provided with a dwell period at the firing position.

5. In an automatic rocket launcher including a single barrel firing tube and a gun belt having a plurality of contiguous interconnected rocket carrying tubes, the combination with means for indexing each rocket carrying tube in the gun belt from loading position to firing position in alinement with said firing tube, and blast operated means for driving said indexing means, of a normally disengaged clutch interposed between said blast operated means and said indexing means, means to effect continued engagement of said clutch rendered operative by a succession of rockets passing through said firing tube to effect automatic indexing and firing of each succeeding rocket, said rocket operative clutch engaging means comprising a trip lever secured to said firing tube adjacent the muzzle end projecting into said firing tube in the path of travel of a rocket passing up said tube, a horizontally reciprocable rod having one end pivotally connected to said muzzle trip lever, a lever adapted to engage and actuate said clutch pivotally connected to the other end of said rod, a compression spring encircling said rod spring means adapted to urge said clutch engaging lever into continued engagement with said clutch in response to continued operation of said muzzle trip lever by a succession of fired rockets, and means including an electric firing circuit for firing a rocket located in firing position, said gun belt indexing means comprising an intermediate shaft adapted to be driven by said blast operated means when said clutch is engaged, a bevel gear on said intermediate shaft, a belt drive shaft at right angles to said intermediate shaft and having secured thereon a bevel gear meshing with said bevel gear on said intermediate shaft, each opposed end of said belt drive shaft having keyed thereon an eccentric rotatable therewith, a support member freely rotatable about each said eccentric, a sprocket secured to each said support member adapted to engage links on said gun belt, an internal gear secured to said support member axially inwardly of said sprocket member, an external gear about said belt drive shaft meshing with said internal gear, and an idler shaft horizontally removed from said belt drive shaft and mounting an idler sprocket adapted to engage said links on said gun belt.

6. The combination in claim 5 wherein said external gear is freely rotatable with respect to said belt drive shaft, torque tube means rotatable about said belt drive shaft secured to said external gear, and cam means driven by said intermediate shaft in timed relation to the speed of said belt drive shaft adapted to engage and to oscillate said torque tube and external gear in timed relation to the speed of said belt drive shaft whereby each said rocket carrying tube is provided with a dwell period at the firing position.

7. In an automatic rocket launcher, a single barrel firing tube, a continuous gun belt having a plurality of contiguous interconnected rocket carrying tubes adapted to successively feed rockets into said firing tube, a belt drive shaft having planetary gearing mounted on opposed ends thereof including a pair of sprockets adapted to engage and to advance said gun belt in response to rotation of said belt drive shaft to continuously move each said rocket carrying tube from loading position to firing position, an intermediate shaft for driving said belt drive shaft and having a bevel pinion meshing with a bevel gear on said belt drive shaft, a turbine wheel adjacent the breech end of said firing tube projecting into the path of exhaust gases of a fired rocket, a turbine shaft rotatable with said turbine wheel, a driving shaft rotatable by said turbine shaft through meshing bevel gears, a normally disengaged multiple disc clutch having a driving plate on said driving shaft and a driven plate on said intermediate shaft, means including an electric firing circuit for firing a first rocket and each succeeding rocket located in firing position, a trip lever extending into said firing tube and interposed in the path of a rocket travelling up said tube, and means positively and directly connecting said trip lever and said driven plate and rendered operative by the rocket passing through the firing tube to effect engagement of said driving and driven clutch plates.

8. The combination in claim 7 wherein said means rendered operative to effect engagement of said trip lever with said driven plate comprises, a clutch actuating lever pivotally secured to said launcher having one end adapted to abut said driven plate and to move said driven plate into and out of engagement with said driving plate, and a clutch operating rod having one end pivotally connected to said muzzle trip lever, and the other end connected to the end of said clutch actuating lever adjacent the pivot thereon.

9. The combination in claim 8 including a pair of axially spaced stop members secured to said clutch operating rod, hold in pawls adapted to be moved into and out of engagement with said stop members, elongated hold-in-pawl levers secured to said hold-in-pawls, a pair of cams adapted to engage said hold-in-pawl levers secured to said intermediate shaft and rotatable therewith when said clutch is engaged whereby said pawls are alternately moved into and out of engagement with said cams for each firing cycle to maintain said rod in clutch engaged position during the firing of a succession of rockets.

10. The combination in claim 9 including a hand operated trigger switch in said firing circuit closeable to energize said circuit, a third switch cam on said intermediate shaft axially spaced from said hold-in-pawl cams adapted to actuate a switch in said firing circuit in timed sequence to the advancement of said gun belt to fire each succeeding rocket located in firing position in said firing tube.

11. In an automatic rocket launcher, a single barrel firing tube, a continuous gun belt having a plurality of contiguous interconnected rocket carrying tubes adapted to successively feed rockets into said firing tube, a belt drive shaft having planetary gearing mounted on opposed ends thereof for driving a pair of sprockets adapted to engage and to advance said gun belt in response to rotation of said belt drive shaft to move each said rocket carrying tube from loading position, to firing position in said firing tube, means including an electric firing circuit for firing a rocket located in firing position in said firing tube, an intermediate shaft adapted to drive said gun belt shaft through reduction gearing, a normally disengaged multiple disc clutch including a driven member mounted on said intermediate shaft, a blast operated turbine wheel projecting into said firing tube rearwardly of said firing position and in the path of exhaust gases from a fired rocket, a driving shaft adapted to be rotated by said turbine wheel, a driving clutch plate on said driving shaft, means rendered operative by a rocket passing through said firing tube to effect engagement of said driven member and driving clutch plate to automatically cycle said gun belt when said firing circuit is continually energized, a gear concentric with said driven clutch plate adapted to mesh with a pinion mounted upon an auxiliary driven clutch shaft, an auxiliary combination multiple disc clutch and brake having a driven clutch plate and brake drum mounted on said auxiliary shaft, said auxiliary clutch having a manual belt cycling position and a dud-eject position, an auxiliary driving shaft having a driving clutch plate mounted thereon, motor means for rotating said auxiliary drive shaft, hand operated means actuable to bring said auxiliary clutch driving and driven plates into manual cycling position when a dud is encountered in firing position, and means including an electric circuit to energize said auxiliary drive shaft motor whereby said gun belt is advanced one round from firing position to dud ejection position.

12. The combination in claim 11 wherein said hand operated means in actuable when said gun belt is in dud eject position to place said auxiliary clutch in dud eject position, ram carriage means in said launcher shiftable to engage and to eject said dud, and a shaft connecting said auxiliary clutch and said ram carriage means rotatable when said auxiliary clutch is in dud ram position for operating said ram carriage to engage and eject said dud from said gun belt.

13. In an automatic rocket launcher including a single barrel firing tube and a gun belt having a plurality of contiguous interconnected rocket carrying tubes, the combination with means for indexing each rocket carrying tube in said gun belt from loading position to firing position in alinement with said firing tube, and blast operated means for driving said indexing means, of a normally disengaged clutch interposed between said blast operated means and said indexing means, and means to effect continued engagement of said clutch rendered operative by a succession of rockets passing through said firing tube to effect automatic indexing and firing of each succeeding rocket, said gun belt indexing means comprising an intermediate shaft adapted to be driven by said blast operated means when said clutch is engaged, a bevel gear on said intermediate shaft, a belt driving shaft member, an eccentric coaxially mounted on said driving shaft member, an eccentric coaxially mounted on said driving member for rotation therewith, a driven member mounted coaxially of said eccentric for rotation bodily completely around the axis of said driven member, and intermediate member operatively connecting said driving and driven members and mounted for rotation about said driving member, and a control member for varying the position of said intermediate member relatively to said driving member and in timed sequence therewith for varying the velocity of said driven member.

14. The combination in claim 13 including a sprocket wheel supported on said driven member adapted to engage links in said gun belt.

15. The combination in claim 14 wherein said control member comprises a torque tube rotatable about said driving shaft member, means for keying said torque tube to said intermediate member, and cam means driven by said intermediate shaft adapted to engage and to oscillate said torque tube and said intermediate member.

16. The combination in claim 15 wherein said driven member comprises an internal gear and said intermediate member comprises an external gear meshing with said internal gear.

17. In an automatic rocket launcher including a single barrel firing tube and a gun belt having a plurality of contiguous interconnected rocket carrying tubes, the combination with means for indexing each rocket carrying tube in the gun belt from loading position to firing position in alinement with said firing tube, and blast operated means for driving said indexing means, of a normally disengaged clutch interposed between said blast operated means and said indexing means, and means to effect continued engagement of said clutch rendered operative by a succession of rockets passing through said firing tube to effect automatic indexing and firing of each succeeding rocket, said gun belt indexing means comprising an intermediate shaft adapted to be driven by said blast operated means when said clutch is engaged, a bevel gear on said intermediate shaft, a belt drive shaft at right angles to said intermediate shaft and having secured thereon a bevel gear meshing with the bevel gear in said intermediate shaft, each opposed end of said belt drive shaft having keyed thereon an eccentric rotatable therewith, a support member freely rotatable about each said eccentric, a sprocket secured to each support member adapted to engage links on said gun belt, an internal gear secured to said support member axially inward of said sprocket member, an external gear about said belt drive shaft meshing with said internal gear, torque tube means rotatable about said belt drive shaft secured to said external gear, said means including outer bearing races on the inner surface of said torque tube cooperating with races about said belt drive shaft, a pair of axially spaced brackets secured to the outer surface of said torque tube and extending radially outward therefrom, each said bracket being equally angularly located on opposed sides of a diametrical line through said torque tube, a roller member secured to the inner facing surfaces of each said bracket, and cam members on a common shaft adapted to be driven by said intermediate shaft and engaging the peripheral surface of each said roller, each said cam member having a configuration whereby said torque tube and external gear are oscillated in the rotary motion relative to the rotation of said belt drive shaft.

18. In an automatic rocket launcher including a single barrel firing tube and a gun belt having a plurality of contiguous interconnected rocket carrying tubes, the combination with means for indexing each rocket carrying tube in the gun belt from loading position to firing position in alinement with said firing tube, and blast operated means for driving said indexing means, of a normally disengaged clutch interposed between said blast operated means and said indexing means, means to effect continued engagement of said clutch rendered operative by a succession of rockets passing through said firing tube to effect automatic indexing and firing of each succeeding rocket, said rocket operative clutch engaging means comprising a trip lever secured to said firing tube adjacent the muzzle end projecting into said firing tube in the path of travel of a rocket passing up said tube, a horizontally reciprocable rod having one end pivotally connected to said muzzle trip lever, a lever adapted to engage and actuate said clutch pivotally connected to the other end of said rod, a compression spring encircling said rod, spring means adapted to urge said clutch engaging lever into continued engagement with said clutch in response to continued operation of said muzzle trip lever by a succession of fired rockets, and means including an electric firing circuit for firing a rocket located in firing position, said gun belt indexing means comprising an intermediate shaft adapted to be driven by said blast operated means when said clutch is engaged, a bevel gear on said intermediate shaft, a belt drive shaft at right angles to said intermediate shaft and having secured thereon a bevel gear meshing with said bevel gear on said intermediate shaft, each opposed end of said belt drive shaft having keyed thereon an eccentric rotatable therewith, a support member freely rotatable about each said eccentric, a sprocket secured to each said support member adapted to engage links on said gun belt, an internal gear secured to said support member axially inwardly of said sprocket member, an external gear about said belt drive shaft meshing with said internal gear, torque tube means rotatable about said belt drive shaft secured to said external gear, said means including outer bearing races on the inner surface of said torque tube cooperating with races about said belt drive shaft, a pair of axially spaced brackets secured to the outer surface of said torque tube and extending radially outwardly therefrom, each said bracket being equally angularly located on opposed sides of a diametrical line through said torque tube, a roller member secured to the inner facing surfaces of each said bracket, and cam members on a common shaft adapted to be driven by said intermediate shaft and engaging the peripheral surface of each roller, each said cam member having a configuration whereby said torque tube and external gear are oscillated in timed rotary motion relative to the rotation of said belt drive shaft.

19. The combination in claim 18 including a pair of axially spaced stop members secured to said clutch operating rod, hold-in-pawls adapted to be moved into and out of engagement with said stop members, elongated hold-in-pawl levers secured to said hold-in-pawls, a pair of cams adapted to engage said hold-in-pawl levers secured to said intermediate shaft and rotatable therewith when said clutch is engaged whereby said pawls are alternately moved into and out of engagement with said cams for each firing cycle to maintain said rod in clutch engaged position during the firing of a succession of rockets.

20. The combination in claim 19 including a hand operated trigger switch in said firing circuit closable to energize said firing circuit.

21. The combination in claim 20, including a third cam on said intermediate shaft adapted to alternately open and close a firing sequence switch in said firing circuit when said trigger switch is closed, in timed sequence with the indexing movement of said gun belt to fire each succeeding rocket located in firing position in said gun belt.

22. The combination in claim 21 wherein said blast operated means comprises a turbine wheel located in said firing tube adjacent the breech end and in the path of exhaust gases of a fired rocket, a turbine shaft driven by said turbine wheel, and a second shaft driven by said turbine shaft through a pair of mated bevel gears, said second shaft adapted to drive said intermediate shaft when said clutch is in engaged position.

References Cited in the file of this patent

UNITED STATES PATENTS

| | | |
|---|---|---|
| 1,424,751 | Bangerter | Aug. 8, 1922 |
| 2,440,723 | MacDonald | May 4, 1948 |
| 2,460,321 | Walker | Feb. 1, 1949 |
| 2,468,216 | MacDonald | Apr. 26, 1949 |
| 2,485,715 | Eastman | Oct. 25, 1949 |
| 2,649,890 | Davidson | Aug. 25, 1953 |
| 2,717,534 | Atherton | Sept. 13, 1955 |
| 2,745,317 | Stanton et al. | May 15, 1956 |

FOREIGN PATENTS

| | | |
|---|---|---|
| 632,599 | Great Britain | Nov. 28, 1949 |
| 285,816 | Switzerland | Jan. 16, 1953 |